United States Patent
Voroba et al.

(10) Patent No.: US 7,095,981 B1
(45) Date of Patent: Aug. 22, 2006

(54) LOW POWER INFRARED PORTABLE COMMUNICATION SYSTEM WITH WIRELESS RECEIVER AND METHODS REGARDING SAME

(75) Inventors: Barry Voroba, Minnetonka, MN (US); Marlyn J. Anderson, St. Louis Park, MN (US)

(73) Assignee: Great American Technologies, Oceanside, NY (US)

( * ) Notice: Subject to any disclaimer, the term of this patent is extended or adjusted under 35 U.S.C. 154(b) by 0 days.

(21) Appl. No.: 09/542,708

(22) Filed: Apr. 4, 2000

(51) Int. Cl.
*H04B 7/00* (2006.01)
*H04M 1/00* (2006.01)

(52) U.S. Cl. .............. 455/41.2; 455/426.1; 455/569.1; 375/295

(58) Field of Classification Search ............. 455/550.1, 455/552.1, 554.2, 556.1, 557, 569.1, 569.2, 455/575.1, 575.2, 575.6, 575.9, 90.2, 90.3, 455/41.1, 41.2, 41.3, 90.1; 375/259, 219, 375/258; 340/825.69; 704/275, 248; 379/56.3, 379/56.1, 56.2
See application file for complete search history.

(56) References Cited

U.S. PATENT DOCUMENTS

| | | | |
|---|---|---|---|
| 4,980,926 A | | 12/1990 | Noetzel |
| 5,027,433 A | * | 6/1991 | Menadier et al. ............ 398/129 |
| 5,241,410 A | * | 8/1993 | Streck et al. ............... 398/115 |
| 5,446,783 A | * | 8/1995 | May ........................... 455/557 |
| 5,495,357 A | * | 2/1996 | Osterhout ................... 398/107 |
| 5,568,516 A | * | 10/1996 | Strohallen et al. .......... 375/259 |
| 5,615,229 A | | 3/1997 | Sharma et al. |
| 5,636,264 A | * | 6/1997 | Sulavuori et al. ............. 398/41 |
| 5,714,741 A | | 2/1998 | Pieterse et al. |
| 5,774,791 A | * | 6/1998 | Strohallen et al. ......... 455/41.1 |

(Continued)

FOREIGN PATENT DOCUMENTS

| | | | |
|---|---|---|---|
| EP | 613320 | * | 8/1994 |
| EP | 0 665 655 A | | 8/1995 |
| FR | 2 730 592 A | | 8/1996 |
| GB | 2 103 043 A | | 2/1983 |
| WO | WO 99/34576 | * | 8/1999 |
| WO | WO 9934576 | * | 8/1999 |

OTHER PUBLICATIONS

SpyLab—The Over the Counter Spy Shop, "Discrete Radio Headset with Wireless Earpiece," p. 2 of 3 pages, www.spylab.com/twowayradios.htm (available on-line as of Mar. 8, 2000).
Technology Hong Kong, "MG9901, Hands-Free System for Automobile," 2 pages, 5 mhk.com/MG9001.htm (available on-line as of Mar. 8, 2000).
Soloring.com, Inc., Garden Grove, CA, "What is wireless handsfree soloring?" [online; accessed on Oct. 30, 2000]. From Internet URL:<www.soloring.com>, 15 pages.
Soloring.com, Inc., Garden Grove, CA, "Meet the latest concept of wireless handfree" advertisement brochure, undated, 2 pages.

*Primary Examiner*—Tilahun Gesesse
(74) *Attorney, Agent, or Firm*—Mueting, Raasch & Gebhardt, P.A.

(57) ABSTRACT

A portable communication system provides a universal transmitter that mechanically couples to a communication device having a sound output, e.g., a cellular phone handset, and which transforms the sound output into infrared signals, e.g., pulses, for transmission to a wireless receiver, e.g., a behind the ear or in the ear receiver.

21 Claims, 18 Drawing Sheets

U.S. PATENT DOCUMENTS

| | | |
|---|---|---|
| 5,812,598 A | 9/1998 | Sharma et al. |
| 5,867,794 A * | 2/1999 | Hayes et al. ................ 455/557 |
| 5,881,149 A | 3/1999 | Weatherill |
| 5,907,418 A * | 5/1999 | Walczak et al. ............ 398/106 |
| 5,966,643 A | 10/1999 | Radley |
| 6,151,149 A | 11/2000 | Rybicki et al. |
| 6,236,969 B1 | 5/2001 | Ruppert et al. |
| 6,281,811 B1 * | 8/2001 | Ranzino ..................... 340/988 |
| 6,393,301 B1 * | 5/2002 | Oda ........................... 455/557 |
| 6,421,426 B1 * | 7/2002 | Lucey ....................... 379/56.3 |

* cited by examiner

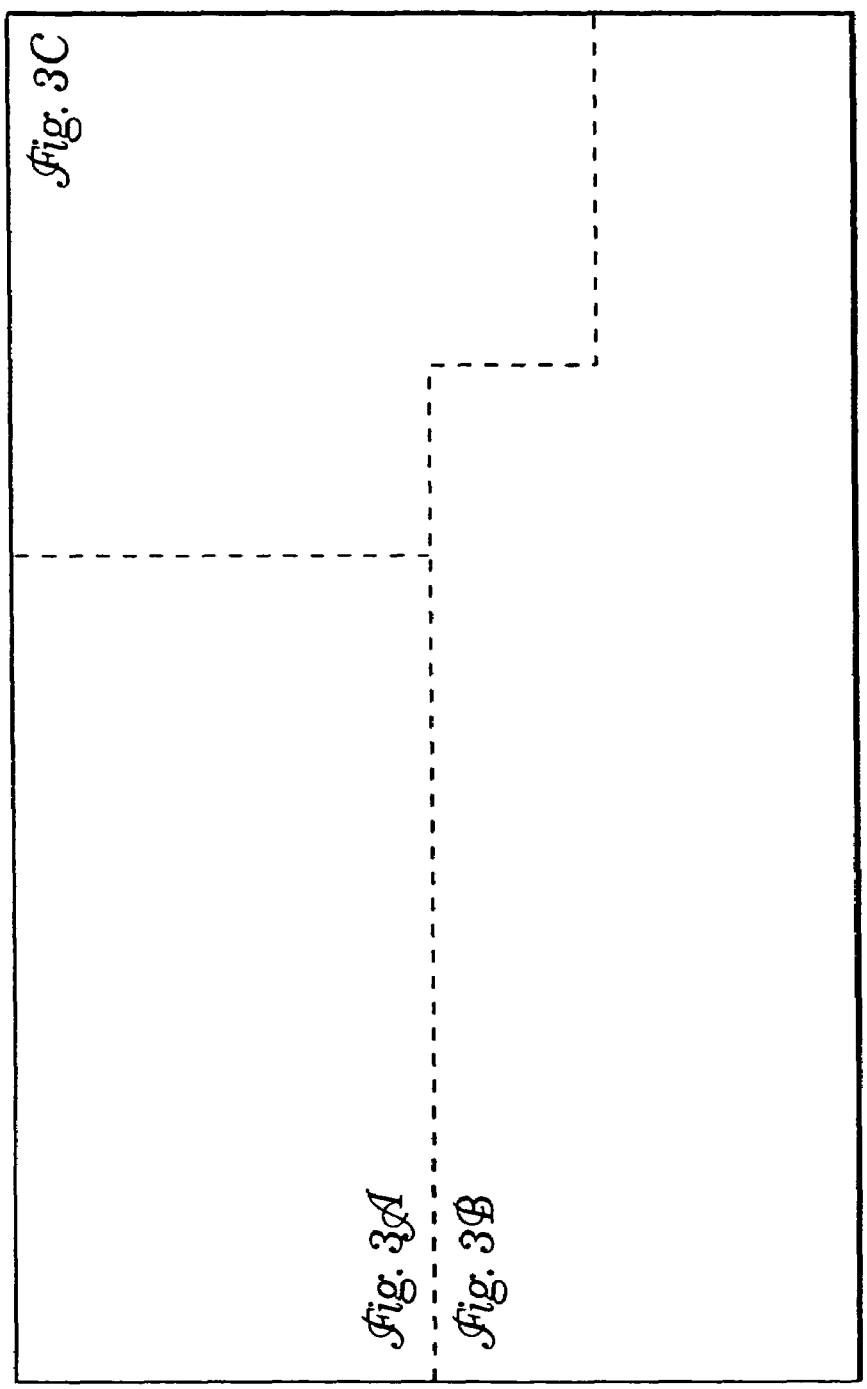

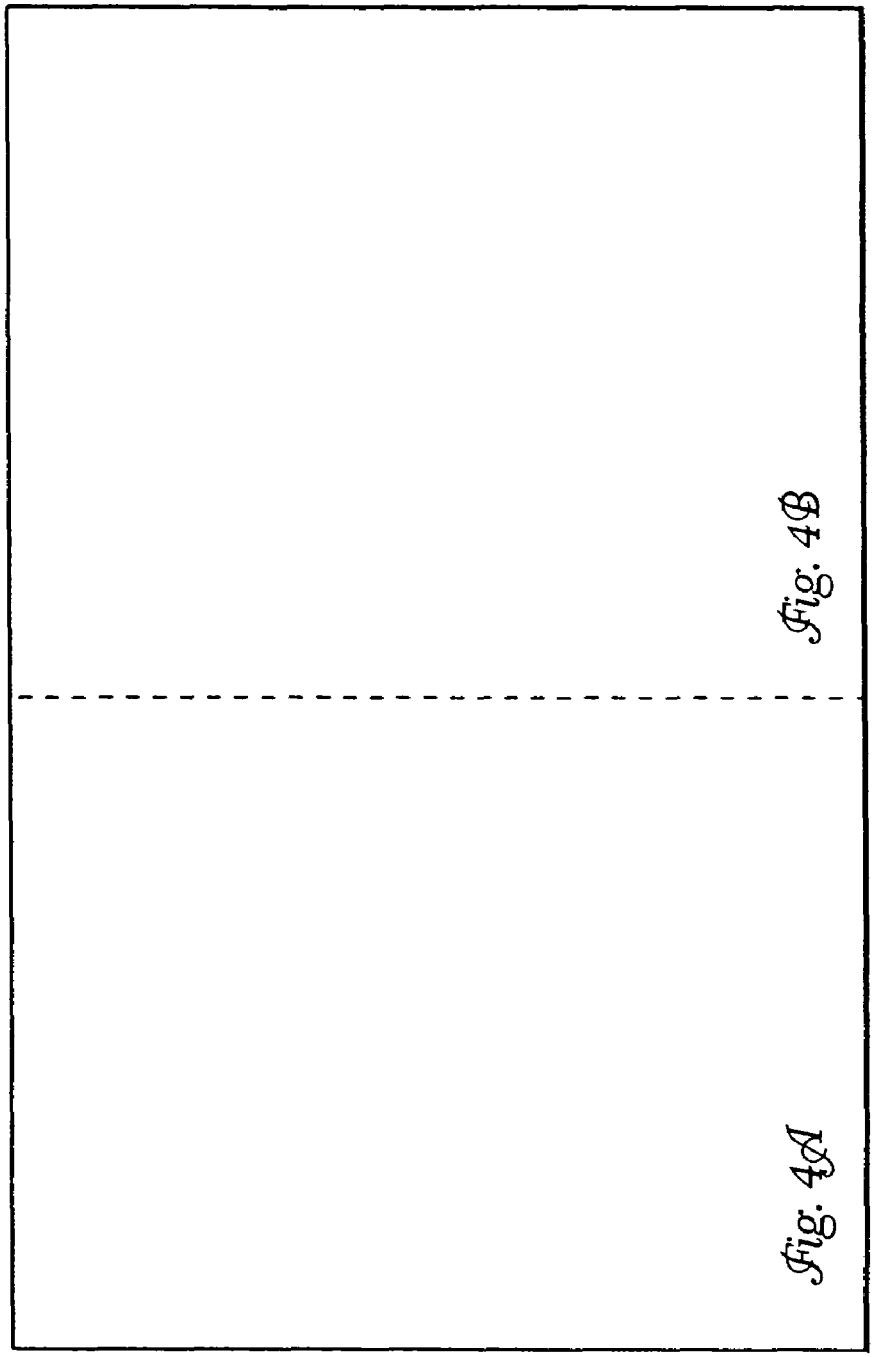

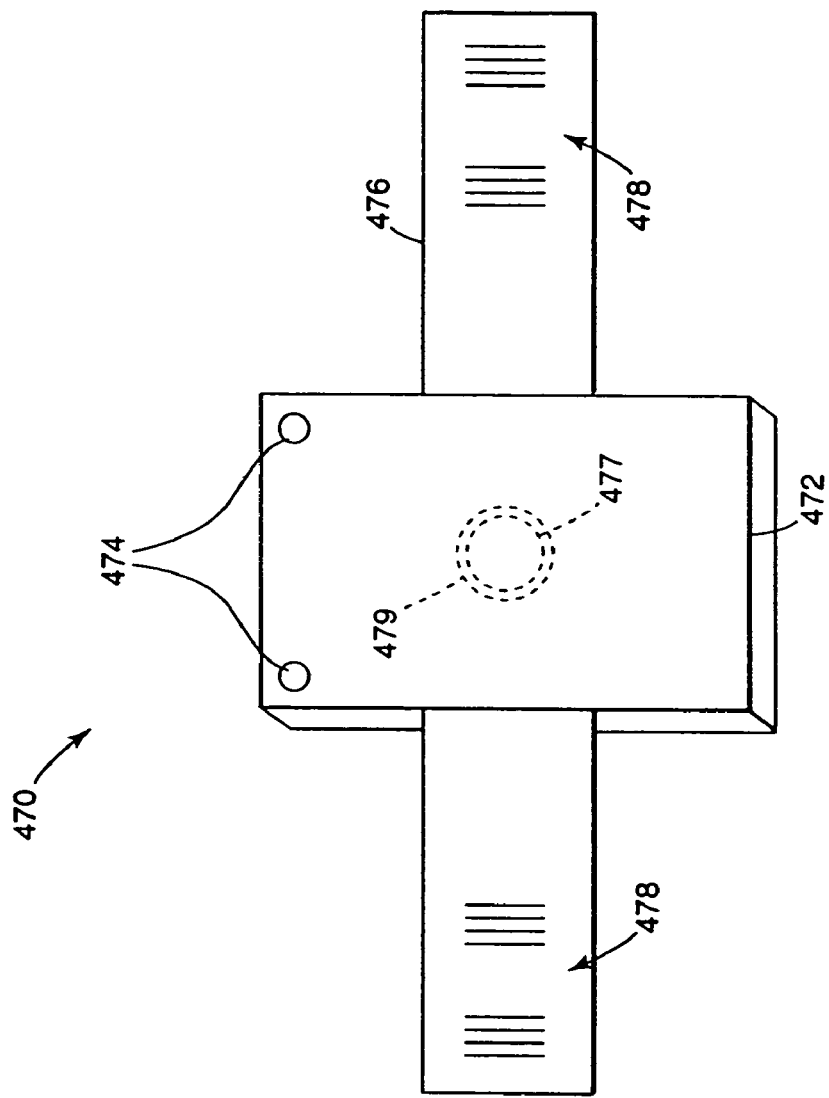

LOW POWER INFRARED PORTABLE COMMUNICATION SYSTEM WITH WIRELESS RECEIVER AND METHODS REGARDING SAME

FIELD OF THE INVENTION

The present invention pertains to portable communication systems. More particularly, the present invention relates to an infrared (IR) portable system that employs an infrared wireless receiver and/or an IR wireless transmitter.

BACKGROUND OF THE INVENTION

Short range, wireless transmission of audio is an established and convenient manner for users to listen to sound sources such as television, stereo and computer multimedia devices without disturbing others. Typically, such privacy listening systems employ one or two earphones mounted into a headset that contains the receiver circuitry and power supply.

Generally, wireless communication systems use one of acoustic, radio frequency, infrared, and inductive techniques for short range transmission of audio. Radio frequency and infrared signal transmission are most commonly used for such short range transmission; however, magnetic induction is also used as described in U.S. Pat. No. 5,774,791 to Strohallen et al., entitled "Low Power Wireless Communication System Employing Magnetic Control Zones," issued 30 Jun. 1998.

As described in U.S. Pat. No. 5,774,791, a receiver configured as a behind the ear (BTE) hearing aid, an in the ear (ITE) hearing aid, or as a cordless headset is described. A transmitter unit, which may include a microphone for picking up external sounds, modulates audio sound to drive a magnetic transmission element, e.g., a neck loop, for transmission to the receiver. The receiver, which includes a magnetic receiving element, demodulates the received signal to provide a sound output to the user. In one embodiment of U.S. Pat. No. 5,774,791, a headset which includes the receiver containing the magnetic receiving element, also may include an infrared (IR) transmitter for transmitting signals back to a base station for two-way communication.

Various types of phones are available, such as cordless phones, cordless cellular phones, corded phones, etc. In particular, cellular phone usage has increased dramatically over the years. Most hand-held radiotelephones, such as mobile phones, or cordless telephones are designed to assume at least the size of a conventional handset during operation, e.g., a fixed handset configuration or a flip phone configuration, with the antenna being in close proximity to the user's head. Recently, health concerns over cell phone radiation and the safety concerns over use of the cell phones while driving (e.g., desire for hands free operation) invite significant new development in this technology.

Several earpiece receivers have been described for phones even though the generally sizeable circuitry and battery power requirements for IR receivers pose a significant challenge to subminiaturization and have generally precluded the use of a comfortable and convenient subminiature earpiece. For example, U.S. Pat. No. 5,881,149 to Weatherill, entitled "Portable Communications Device With Wireless Transmitter and Detachable Earpiece Including a Wireless Receiver," issued 9 Mar. 1999, describes a portable communication device, i.e., a phone, having a detachable receiver part which can be placed against the ear for use. The portable communications device has an integral transmitter for communicating with the detachable receiver part. Further, U.S. Pat. No. 5,966,643 to Radley, entitled "Hand-Held Radiotelephone Having Two-Part Construction," issued 12 Oct. 1999, describes a radiotelephone having an earpiece that is spatially separated from the other components of the radiotelephone and includes an IR receiver. The housing of the handheld radiotelephone includes an IR transmitter, i.e., the transmitter is integral with the radiotelephone.

It will be recognized that in each example, the transmitter is integral with the phone. As such, the external wireless earpiece receiver will only function with a particular type of phone.

Further, IR systems have been criticized for being restricted to line of sight communications. While line of sight communications provide for a relatively secure communication link, IR communications have been described as requiring considerable power. For example, the amount of power required by an IR receiver is generally proportional to the ambient light conditions in the user area and the range or distance from the transmitter. Thus, as the ambient light level increases, the power that is needed generally increases. In a like manner, as the range or distance from the transmitter to the receiver increases the power required also increases.

SUMMARY OF THE INVENTION

A portable communication system and components thereof are provided according to the present invention to overcome one or more of the problems described above. The system according to the present invention provides a universal transmitter that mechanically couples to a communication device having a sound output, e.g., a cellular phone handset, and which transforms the sound output into infrared signals for transmission to a wireless receiver. Thus, at least for cellular phones, the type of phone or wire handset is generally irrelevant and the transmitter can be used with numerous types of phones and handsets. A direct input to the transmitter from the sound output of the communication device provides privacy listening. Further, pulse code modulation provides the system according to the present invention with very low power consumption while achieving high quality IR communication. In addition, several designs of a receiver for BTE positioning or ITE positioning are described.

A portable communication system according to the present invention for use with a communication apparatus having a sound output device includes an infrared transmitter apparatus. The infrared transmitter apparatus comprises a microphone to generate an audio signal from received sound input, at least one infrared light emitting device, modulation circuitry operable to convert the audio signal to one or more constant width electrical pulses (e.g., less than about 2 microseconds in duration, preferably less than about 1 microsecond in duration) to drive the infrared light emitting device to transmit one or more corresponding constant width infrared pulses, and a transmitter housing enclosing the microphone and modulation circuitry and upon which the infrared light emitting device is mounted. The transmitter housing is configured to be removably coupled to the communication apparatus such that the microphone is positioned adjacent the sound output device of the communication apparatus. The system further includes an infrared receiver apparatus. The infrared receiver apparatus includes an infrared light detection device to detect the one or more corresponding infrared pulses and generate one or more electric signals representative of the detected infrared pulses, a speaker, demodulation circuitry operable to convert the one or more electric signals representative of the detected infrared pulses to an audio signal to power the speaker to produce a sound output, and a receiver housing enclosing the speaker and the demodulation circuitry and upon which the infrared light detection device is mounted. The receiver housing is formed to be self-supported entirely by the ear of a user.

In various embodiments of the system, the transmitter housing may be sized for positioning of the microphone adjacent a speaker of a phone apparatus, the transmitter housing may include structure for removably attaching the housing to the phone apparatus (e.g., an opening sized to fit over an end of a phone apparatus or an adjustable band element to attach the housing to a phone apparatus), the receiver housing may include an in the ear receiver housing securable within the concha of the ear, and the receiver housing may include a behind the ear receiver housing securable by the pinna of the ear.

In another embodiment of the system, the modulation circuitry includes pulse width modulation circuitry to convert the audio signal using a carrier signal to one or more width modulated pulses. The width of the one or more pulses is varied as a function of the audio signal. The circuitry further includes an edge detect circuit to detect the edges of the one or more width modulated pulses and to generate constant width pulses based on the detected edges. In addition, the circuitry includes a pulse driver circuit to drive the infrared light emitting device.

In another embodiment, the demodulation circuitry includes pulse detection circuitry (e.g., an amplifier configuration and a comparator) to convert the one or more electrical signals representative of the detected infrared pulses to one or more constant width pulses based thereon. Pulse width convertor circuitry (e.g., a flip flop) converts the one or more constant width pulses to one or more width modulated pulses and pulse width demodulation circuitry converts the one or more width modulated pulses to an audio signal for application to the speaker.

The receiver of the system may also include missing pulse detection circuitry that includes detection circuitry to detect the absence of one or more constant width pulses and disable circuitry to disable one or more components of the receiver upon detection of the absence of one or more constant width pulses. In addition, the transmitter of the system may include a sound activated power circuit to power one or more components of the transmitter upon detection of sound input.

A portable infrared transmitter apparatus for use with a communication apparatus having a sound output device is also provided. The transmitter apparatus includes a microphone to generate an audio signal from received sound input, at least one infrared light emitting device, modulation circuitry operable to convert the audio signal to one or more constant width electrical pulses to drive the infrared light emitting diode for transmission of one or more corresponding constant width infrared pulses, and a transmitter housing enclosing the microphone and modulation circuitry and upon which the at least one infrared light emitting device is mounted. The transmitter housing is configured to be removably coupled to the communication apparatus such that the microphone is positioned adjacent the sound output device of the communication apparatus.

In various embodiments of the transmitter apparatus, the transmitter housing may be sized for positioning of the microphone adjacent a speaker of a phone apparatus and the transmitter housing may include structure for removably attaching the housing to the phone apparatus (e.g., an opening sized to fit over an end of a phone apparatus or an adjustable band element to attach the housing to a phone apparatus).

A portable infrared receiver apparatus according to the present invention is also described. The receiver apparatus includes an infrared light detection device to detect one or more infrared pulses and to generate one or more electric signals representative of the detected infrared pulses, a speaker, and demodulation circuitry operable to convert the one or more electric signals representative of the detected infrared pulses to an audio signal to power the speaker to produce a sound output. The demodulation circuitry includes pulse detection circuitry to convert the one or more electrical signals representative of the detected infrared pulses to one or more constant width pulses based thereon, pulse width convertor circuitry to convert the one or more constant width pulses to one or more width modulated pulses, and pulse width modulation circuitry to convert the one or more width modulated pulses to an audio signal for application to the speaker. The receiver apparatus further comprises a receiver housing enclosing the speaker and the demodulation circuitry and upon which the infrared light detection device is mounted. The receiver housing is formed to be self-supported entirely by the ear of a user.

Several receiver housings according to the present invention are also described. In one embodiment, the receiver housing includes an in the ear receiver housing securable within the concha of the ear. The receiver housing includes a speaker portion enclosing at least a speaker and a power source. The speaker portion has a compactable/expandable material about at least a portion thereof to support the receiver housing in the concha of the ear. The material is placed in a compacted state upon insertion in the concha of the ear and further the material expands to an expanded state to hold the receiver housing in the concha of the ear upon release from the compacted state. The receiver housing further includes an elongated portion extending from the speaker portion enclosing at least a portion of the demodulation circuitry. The infrared light detection device is positioned on the elongated portion.

In another embodiment of a receiver housing, the receiver housing includes a behind the ear receiver housing securable by the pinna of the ear. The receiver housing includes a first portion that includes a behind the ear element to secure the receiver housing by the pinna of the ear and a speaker holding element extending from the behind the ear element. The speaker holding element has an opening defined therethrough and includes speaker contacts (e.g., mounted in the opening). The receiver housing includes a second portion encompassing the speaker. The second portion is sized to be retained within the opening and includes speaker contacts for mating with the speaker contacts of the speaker holding element.

A method of using a portable communication system with a phone apparatus having a sound output device is also described according to the present invention. The method includes providing a removable transmitter apparatus. The removable transmitter apparatus includes a microphone to generate an audio signal from received sound input, a transmitter device, modulation circuitry operable to convert the audio signal to an electrical signal to drive the transmitter device for transmission of signals representative of the audio signal, and a transmitter housing enclosing at least the microphone and modulation circuitry. The removable transmitter apparatus is secured to the phone apparatus such that the microphone is positioned adjacent the sound output device of the communication apparatus.

In one embodiment of the method, the removable transmitter apparatus includes an opening sized to fit over a portion of a phone apparatus. As such, the removable transmitter apparatus is secured to the phone apparatus by positioning the opening over the portion, e.g., an end portion of the phone. In another embodiment, the removable transmitter apparatus is secured to the phone apparatus by positioning a band of the removable transmitter apparatus about a perimeter of the phone apparatus. In yet another embodiment, the removable transmitter apparatus may be secured to the phone apparatus by using a two face adhering system, e.g., adhesive, hook and loop fasteners, etc. In another embodiment of the method, the removable transmitter apparatus is detached from the phone apparatus and secured to a different phone apparatus.

BRIEF DESCRIPTION OF THE DRAWINGS

FIG. 13 is an illustrative view of an alternate embodiment of an IR transmitter apparatus having a band element for attachment to a phone apparatus.

DETAILED DESCRIPTION OF THE EMBODIMENTS

Figure 1:
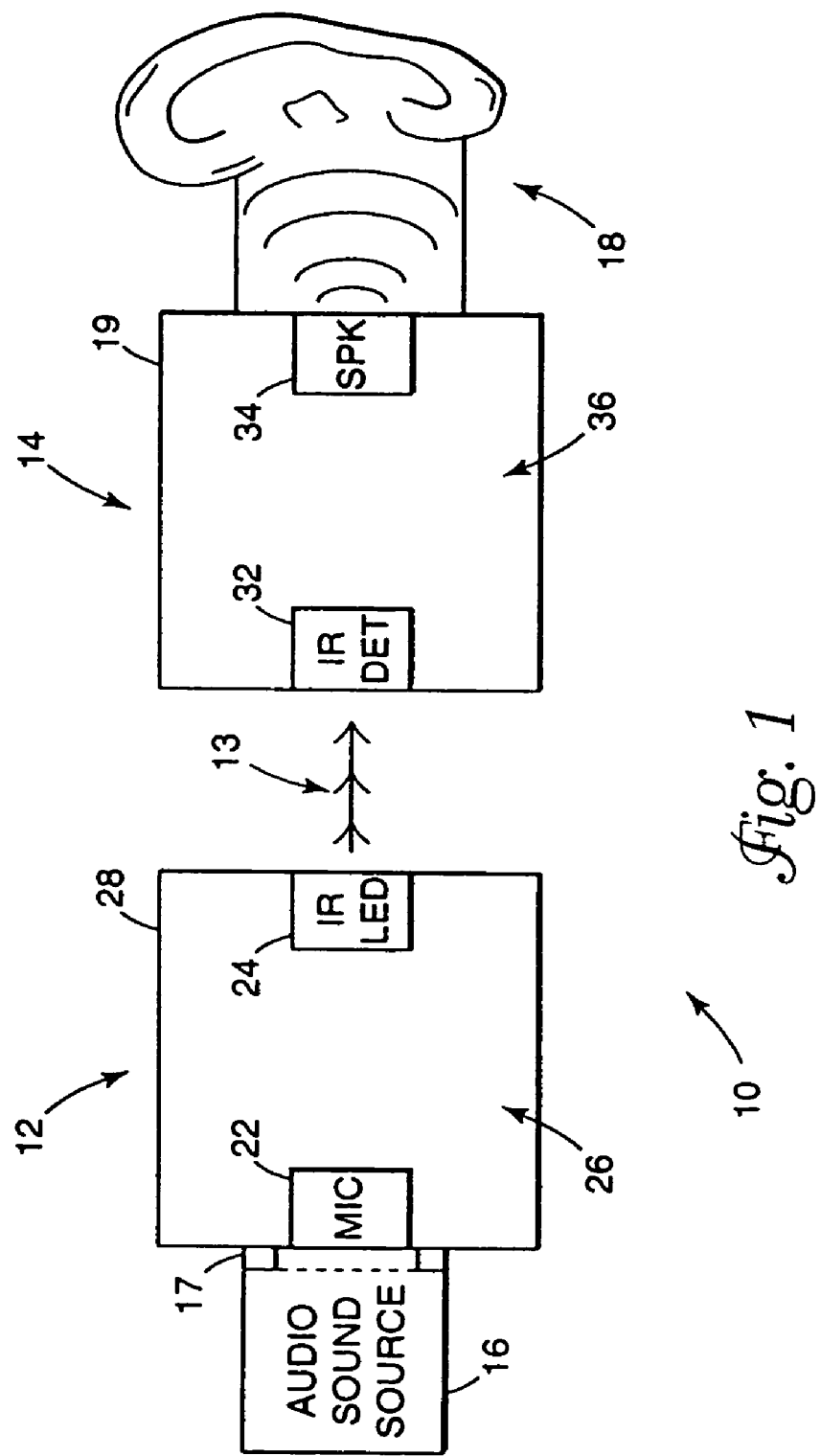
FIG. 1 is a general block diagram illustration of a portable communication system according to the present invention.

A portable communication system 10 according to the present invention shall be described generally with reference to FIG. 1. Thereafter, various embodiments of the portable communication system 10 and components thereof or used therewith shall be described with reference to FIGS. 2–16.

As shown in FIG. 1, portable communication system 10 includes an IR transmitter apparatus 12 which communicates by transmission of IR signals 13, preferably short IR pulses, with a portable IR receiver apparatus 14. Preferably, the IR transmitter is a universal wireless IR transmitter apparatus that mechanically couples to a communication device having a sound output source 16, e.g., a cellular phone handset, and which transforms the sound output into infrared signals 13 for transmission to the wireless receiver apparatus 14. It will be recognized that the present invention, or one or more portions of the invention as described herein, may be beneficially applied to various types of communication devices, e.g., televisions, computers, or any other apparatus having a sound output, electrical (e.g., the system of FIG. 16B, a television, etc.) or acoustical (e.g., a cellular phone, a corded phone handset, etc.), to which a transmitter apparatus can be coupled.

The IR transmitter apparatus 12 includes a transmitter housing 28 in which are located a microphone 22 and modulation circuitry 26. One or more IR emitting devices 24, e.g., IR light emitting diodes (LEDs), are positioned on the transmitter housing 28 for emission of IR signals 13 to the receiver apparatus 14. The microphone 22 is positioned for receiving sound output from an audio sound source 16. The audio source 16 may be any sound producing device of any communication apparatus, such as a televison, a computer speaker, a radio, etc. Preferably, the sound source 16 is a speaker of a phone apparatus such as a handset, corded or wireless. More preferably, the audio sound source 16 is a speaker of a cellular phone.

Figure 11:
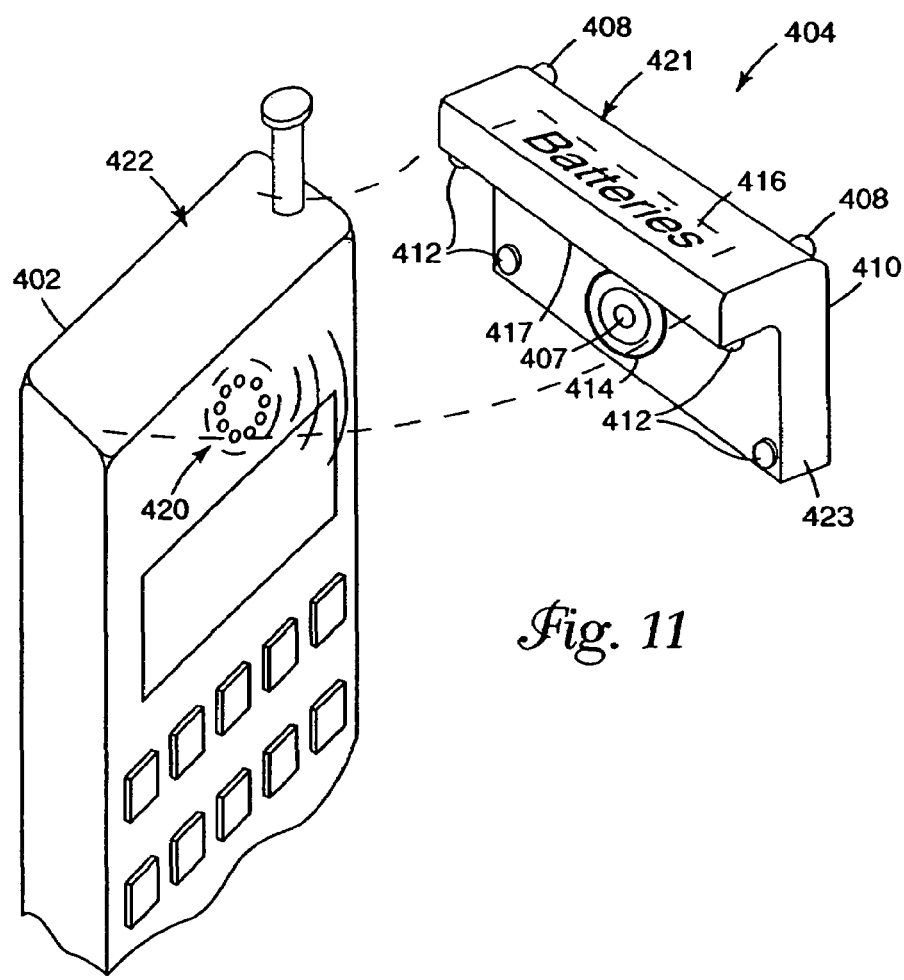
FIG. 11 is a more detailed perspective view of the IR transmitter apparatus of FIG. 10 and the phone with which it can be used.

The transmitter housing 28 is configured to be removably coupled by a coupling device 17 to the communication apparatus, e.g., cellular phone, such that the microphone 22 is positioned adjacent the sound output device 16, e.g., speaker of the phone. Preferably, the microphone 22 is isolated so as to receive only sound from the audio sound source 16 to reduce external noise. Various types of coupling devices 17 are described herein with reference to the figures. For example, as shown in FIG. 11, the transmitter housing may be slipped over one end of a cellular phone, e.g., cap piece mounting. Further, for example, as shown in FIG. 13, the transmitter housing may include a band to wrap around a cellular phone. However, such coupling may be provided by any number of techniques. For example, two face mounting such as with the use of adhesive or hook and loop fasteners may be used, or any other mounting structure that allows the transmitter to be removed and used on another phone may be suitable. Compatibility of the transmitter apparatus for use with multiple communication apparatus, e.g., phones, is preferred.

The microphone 22 generates an audio signal from the received sound to be applied to the modulation circuitry 26. The modulation circuitry 26 provides a modulated signal to drive the IR light emitting device 24 for transmission of IR signals. Preferably, the modulation circuitry 26 is operable to convert the audio signal into a stream of electrical pulses to drive the IR light emitting device 24. Preferably, the audio signal is converted into a stream of constant width electrical pulses to drive the IR light emitting device 24 to transmit one or more corresponding constant width infrared pulses 13. Preferably, the pulse duration is less than about 2 microsecond. More preferably, the pulse duration is less than about 1 microsecond. The use of short pulses in the transmission of IR pulses, allows the power of such pulses to be increased without exceeding the average power rating of the IR light emitting device, e.g., IR LED.

The infrared receiver apparatus 14 includes an infrared light detection device 32 (e.g., an IR sensitive photodiode), demodulation circuitry 36 and a speaker 34. The infrared light detection device 32 detects the IR signal transmitted by IR transmitter apparatus 12. Preferably, the infrared light detection device 32 detects infrared pulses transmitted thereby. The IR light detection device 32 generates one or more electrical signals representative of the detected infrared pulses. The one or more electrical signals are applied to demodulation circuitry 36. Demodulation circuitry 36 is operable to convert the one or more electric signals representative of the detected infrared signals, e.g., pulses, to an audio signal to power the speaker to produce a sound output to be provided to the ear 18 of a user. One skilled in the art will recognize that any modulation and demodulation circuitry may be used for providing communication according to the present invention as long as they are compatible circuits, i.e., the demodulator circuitry is capable of demodulating the modulated signal. For example, several modulation and demodulation techniques are described herein with reference to FIGS. 2–9. Further, other modulation techniques are described in U.S. Pat. No. 5,774,791.

The IR receiver apparatus 14 further includes a portable receiver housing 19. The receiver housing 19 encloses the speaker 34 and the demodulation circuitry 36. The infrared light detection device 32 is mounted on the receiver housing 19. Further, preferably, the receiver housing 19 is formed to be self-supported entirely by the ear of a user. Preferably, the receiver housing 19 is either securable within the concha of the ear or the receiver housing 19 includes a behind the ear element securing the receiver housing 19 by the pinna of the ear. Various configurations of a receiver housing 19 according to the present invention are described herein with reference to FIGS. 12 and 14. However, other forms are contemplated in accordance with the present invention and the universal transmitter 12 as described herein may be used with any wireless receiver configuration, including in the ear or behind the ear configurations as well as wireless headsets.

The portable nature of the IR communication system 10 is attained at least in part through the selection of appropriate modulation and demodulation circuitry. For example, large power requirements for such circuitry generally force an increase in the size of the IR transmitter apparatus and IR receiver apparatus. As such, lower power techniques are used to reduce the size of the components of the present invention, e.g., require less and/or smaller batteries. Further, the complexity of the modulation and demodulation circuitry tends to increase part count leading to a larger size IR transmitter apparatus and IR receiver apparatus as well as to an increase in the cost for the system components. The following description of modulation and demodulation circuitry provided with reference to FIGS. 2–9 provides simple and low power techniques to reduce the size of the transmitter apparatus and receiver apparatus of a portable communication system 10.

Figure 2:
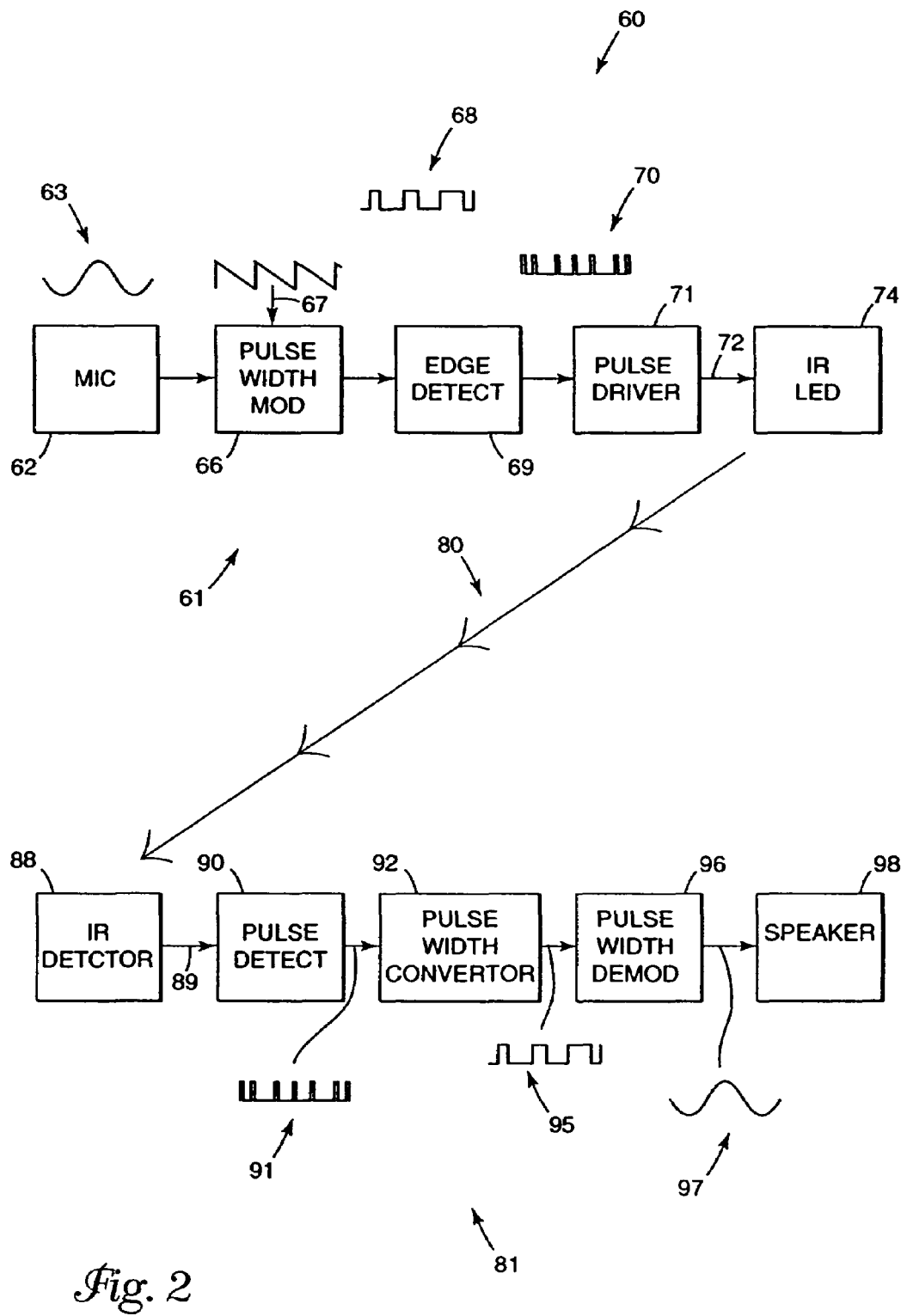
FIG. 2 is a block diagram of one illustrative embodiment of a portable communication system shown generally in FIG. 1.

FIG. 2 shows a block diagram of one illustrative embodiment of a portable communication system 60. The portable communication system 60 of FIG. 2 includes modulation circuitry 61 to convert an audio signal 63 from a microphone 62 to a stream of electrical pulses 72 for driving an IR LED 74 to transmit IR pulses 80. An IR photodiode 88 detects the IR pulses 80 and generates one or more electrical signals 89 representative of the detected IR pulses. The portable communication system 60 further includes demodulation circuitry 81 to convert the electrical signals to an audio signal 97 to power the speaker 98.

The modulation circuitry 61 includes pulse width modulation circuit 67, edge detect circuit 69, and pulse driver 71. With use of such circuitry a constant width pulse stream 70 is applied to the pulse driver 71 to drive the IR LED 74 with a stream of corresponding pulses 72. Preferably, a repetitive substantially linear waveform 67 of fixed repetition rate, i.e., a cyclic waveform having a predetermined total cycle time or period (e.g., a 50 kHz signal having a 20 μsec duty cycle), is provided to pulse width modulation circuit 66 to be modulated by the audio signal 63. The pulse width modulation circuit 66 generates a modulated pulse stream 68 wherein the width of the pulses vary according to the amplitude of the audio signal 63. Thereafter, the pulse width modulated pulse stream 68 is applied to an edge detect circuit 69. The edge detect circuit 69 detects the positive and negative transitions of each pulse of the pulse width modulated pulse stream 68 and generates a stream of constant width short pulses 70, i.e., constant duration pulses, in response to the detected edges or transitions of the pulse width modulated pulse stream 68.

Preferably, the constant width pulses of the stream of pulses 70 have a duty cycle that is less than 10 percent of the total cycle time of the carrier frequency or input linear repetitive signal 67. More preferably, the duty cycle of the constant width pulses of the stream of pulses 70 is less than 5 percent of the total cycle of the carrier frequency or input linear repetitive signal 67. In other words, for a 50 kHz signal having a 20 μsec cycle time, the constant width pulses are preferably less than about 2 μsec, and more preferably less than about 1 μsec. The short pulse duration allows the IR LED to be driven by a higher amplitude pulse without exceeding the average power limits of the IR LED. Such an increase in the power used to drive the IR LED results in an increased distance of detection for the transmitted pulses and/or a better quality received signal. For example, a 10 percent duty cycle means that the IR LED can be pulsed 10 times harder than normal without exceeding the average power limit of such devices. As such, the IR LED can be seen a greater distance away because the LED may shine 10 times brighter. Further, to detect such pulses, generally the input stage devices of a receiver apparatus can be operable for shorter periods of time which decreases power usage by the receiver.

For example, the audio signal 63 may be sampled at a constant frequency of about 50 kHz by a sawtooth waveform 67, e.g., the input carrier signal. The duty cycle of the 50 kHz carrier is made to vary in proportion to the amplitude of the audio signal 63 to result in the pulse width modulated stream 68. Every edge or transition of this pulse width modulated 50 kHz carrier signal 68 generates a very short duration pulse, with each pulse being of a constant width. These pulses are sent to pulse driver 71 to drive the IR LED 74. Since there are two pulses for every cycle of 50 kHz sampling, the total on-time duty cycle will be double that of each pulses on time. Hence, to achieve a 10 percent transmission duty cycle, each pulse will need to have a duty cycle of 5 percent of the total cycle time. Likewise, to achieve a 20 percent transmission duty cycle, each pulse will need to have a duty cycle of 10 percent of the total cycle time.

The demodulation circuitry 81 includes pulse detect circuit 90, pulse width converter circuit 92, and pulse width demodulation circuit 96. With use of such circuitry a stream of electrical signals 89 from an IR photodiode 88 representative of received IR pulses 80 are converted to an audio signal 97 for application to speaker 98. The IR photodiode 88 detects the IR pulses 80 transmitted by IR LED 74 and generates an electrical signal 89 as a function of the detected pulses. The electrical signal 89 is provided to the pulse detect circuit 90 that receives, amplifies and converts the electrical signal from the IR photodiode 88 to a stream of pulses 91 representative of the detected IR pulses 80. This stream of pulses 91 will be similar to the pulse stream 70 generated in the modulation circuitry 61, at least with respect to the time between pulses. The stream of pulses 91 is then applied to the pulse width converter circuit 92 which converts the pulse stream 91 to a pulse width modulated stream of pulses 95. The stream of pulse width modulated pulses 95 include pulses having varied widths, substantially similar to those of pulse stream 68 generated in the modulation circuitry 61. This stream of pulse width modulated pulses 95 is then applied to pulse width demodulation circuit 96 which generates the audio signal 97 therefrom. For example, the demodulation circuit 96 filters the pulse width modulated stream of pulses 95 to obtain the audio signal 97 to be applied to speaker 98.

For example, using the 50 kHz input signal parameters described above, the IR pulses 80 are detected by the IR photodiode 88 and electrical signals representative thereof are buffered, amplified, and converted to digital pulses by the pulse detect circuit 90. These pulses are used to toggle a pulse width converter 92, e.g., a flip flop circuit or a divide by two circuit, to convert the edge driven pulses back to the original duty cycle of the pulse width modulated 50 kHz carrier signal 95 which was used to generate them. The pulse width modulated 50 kHz carrier signal 95 is then filtered by pulse width modulation circuit 96 to leave the audio signal 97 to power the speaker 98.

Figure 3A:
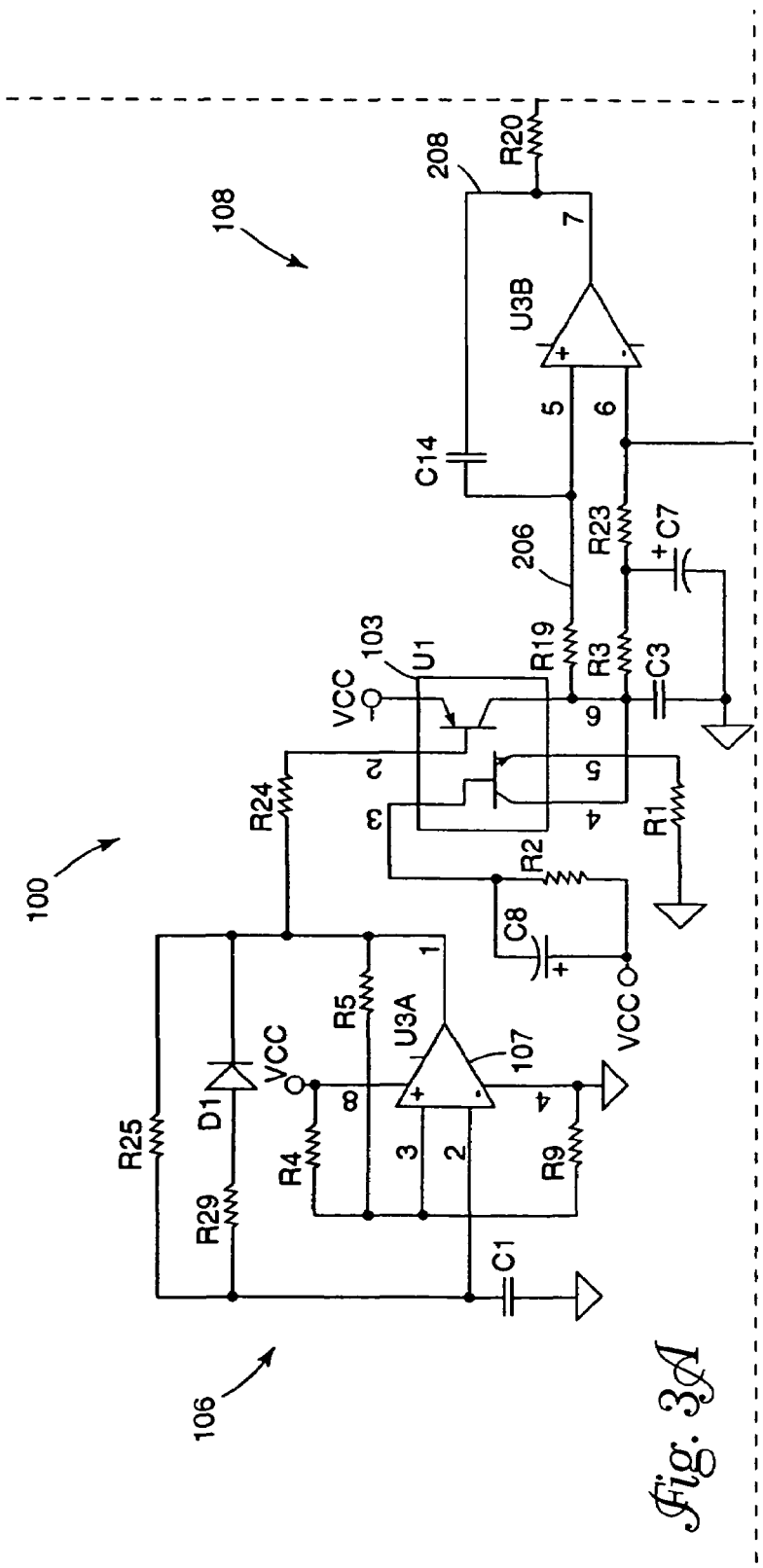
FIG. 3 is a schematic diagram of one illustrative embodiment of an IR transmitter apparatus of a portable communication system shown generally in FIG. 2.
Figure 3B:
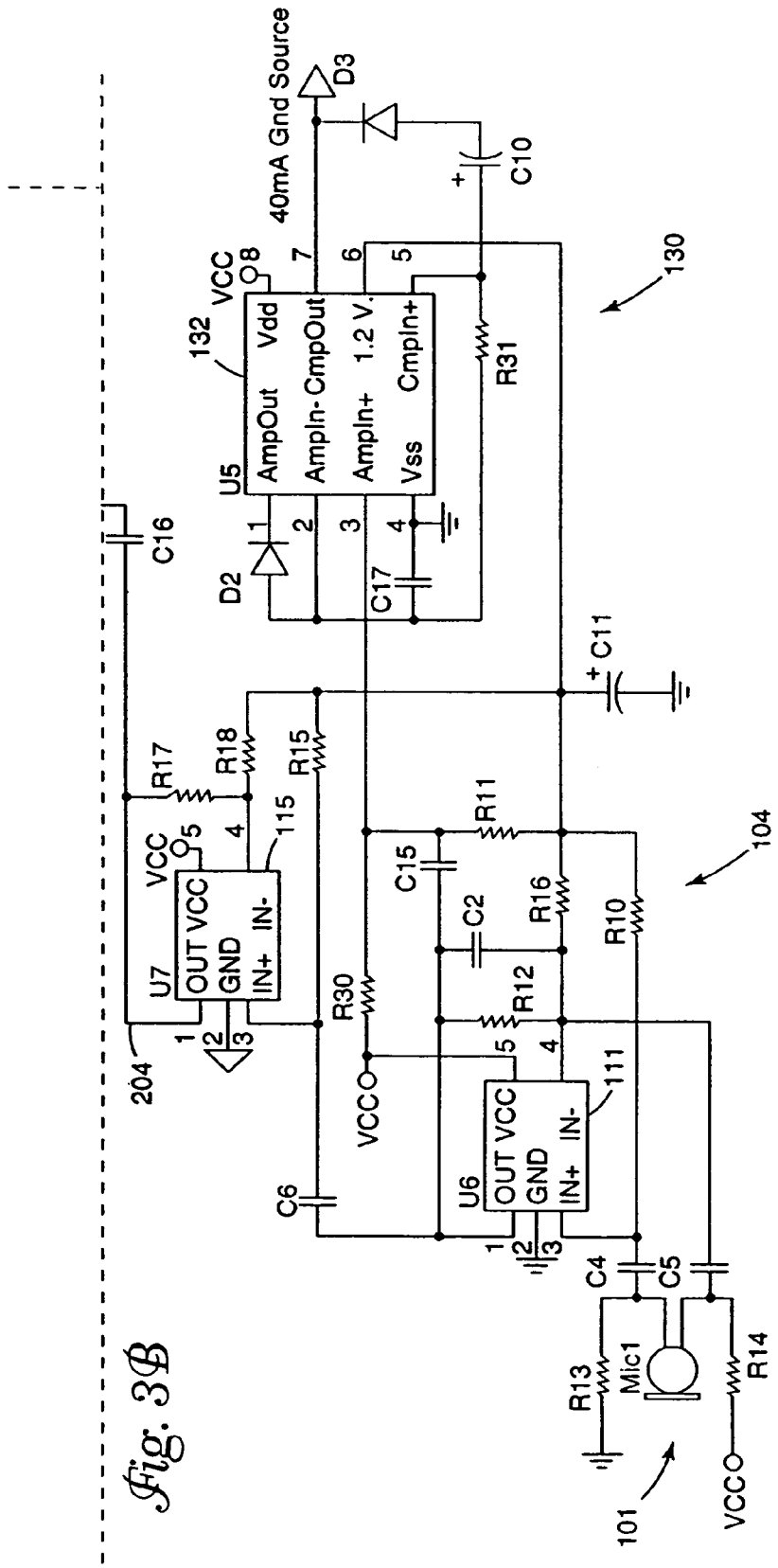
Figure 3C:
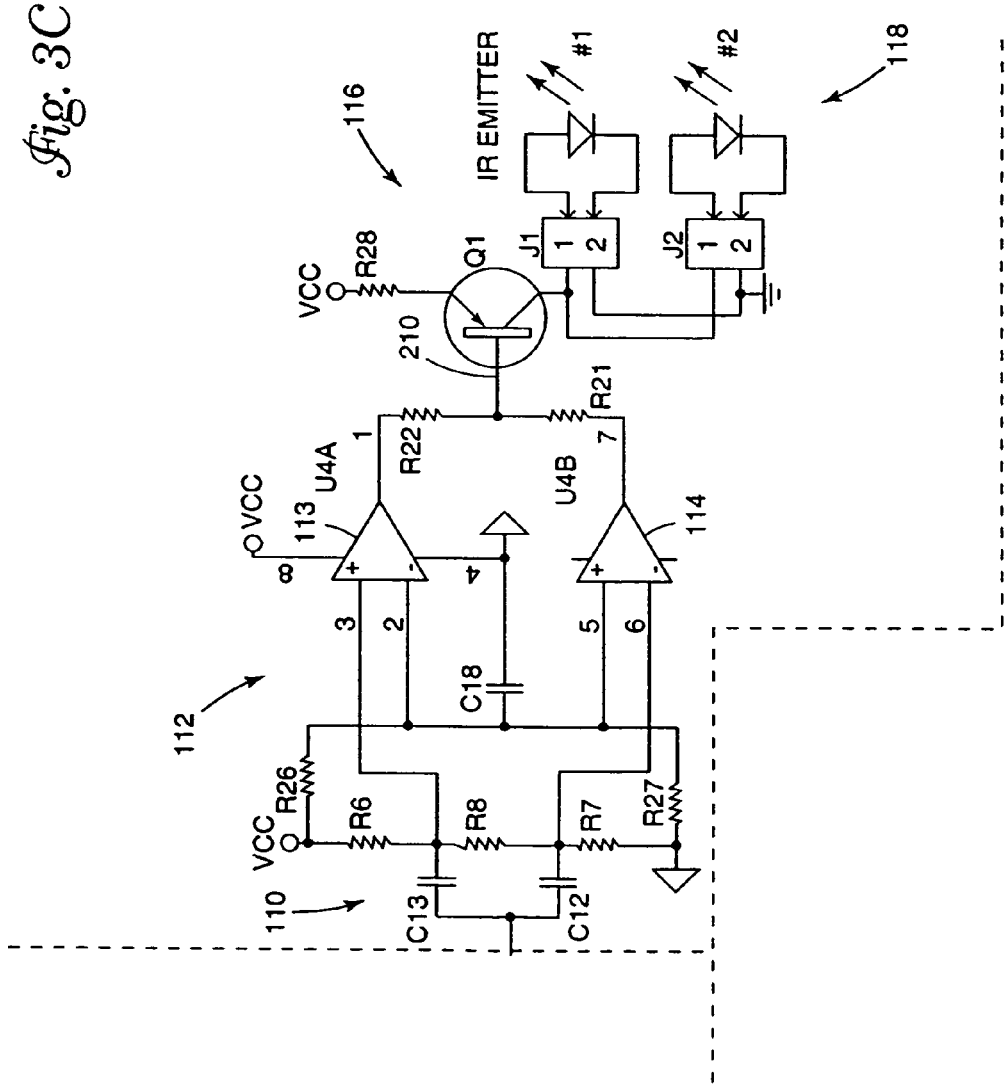

FIG. 3 shows a schematic diagram of one illustrative embodiment for implementing the IR transmitter apparatus shown generally in FIG. 2. However, it will be recognized that various other alternative implementations may be used that fall within the scope of the present invention. The sound switched transmitter circuit 100 shown in FIG. 3 includes a microphone 101, a sawtooth generator circuit 106, a microphone amplifier circuit 104, a sound activated power up circuit 130, a comparator circuit 108, an edge detect or edge to pulse conversion circuit 112, a pulse driver circuit 116, and LEDs 118. The operation of such circuits shall be described with reference to the waveform diagram 202 of FIG. 5.

The microphone 101 picks up sound input and applies an audio signal to microphone amplifier circuit 104 including amplifiers 111 and 115. The audio signal as amplified by amplifier 111 is applied to sound activated power up circuit 130 to determine the presence of an audio signal having sufficient amplitude such that other transmitter circuitry should be supplied with power, including amplifier 115. The sound activated power up circuit 130 includes an amplifier/comparator circuit 132, and also power switch circuitry, used to perform peak detection and to compare the peaks detected to a reference signal. Upon receipt of an audio signal having an amplitude above a certain predetermined limit, power is switched on to other portions of the transmitter circuit via ground connections, including power to amplifier 115.

Figure 5:
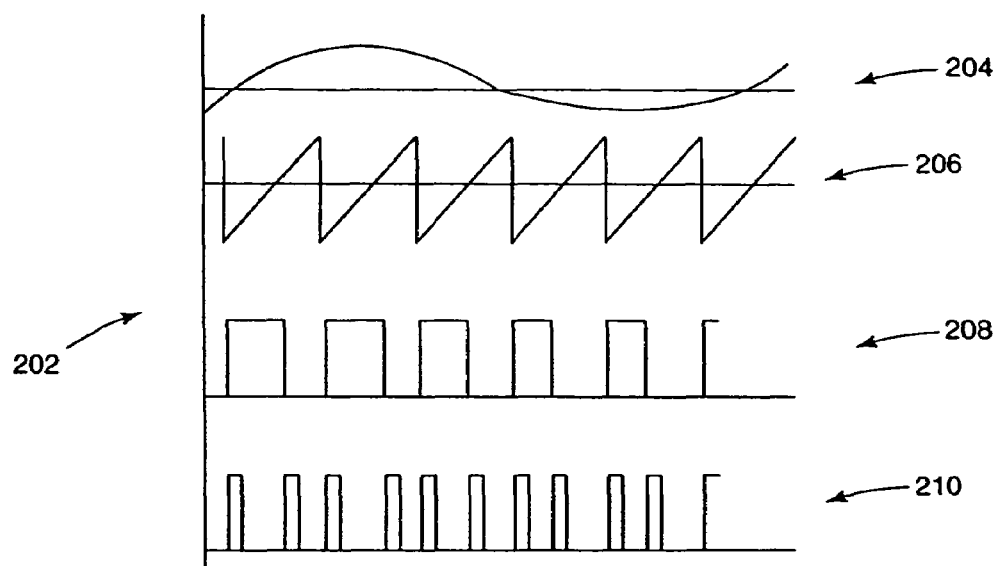
FIG. 5 is a waveform diagram used to illustrate the functions provided by the IR transmitter apparatus of FIG. 3.

The audio signal amplified by amplifier 111 is provided to amplifier 115 and amplified thereby when power is provided thereto. As such, the audio signal 204 having a desired amplitude, as shown in FIG. 5, is applied to the negative input of comparator circuit 108. The sawtooth generator circuit 106 generates a ramped 50 kHz sawtooth waveform 206 as shown in FIG. 5. One skilled in the art will recognize that other cyclic waveforms may be suitable for use according to the present invention. The comparator 107 is used to reset the sawtooth pulse every 20 μseconds and the dual transistor package 103 is used to provide the desired ramp for the waveform 206. The sawtooth waveform 206 is applied to the positive input of comparator circuit 108. The comparator circuit 108 compares the audio signal 204 and the sawtooth waveform 206, and generates an output that is a pulse width modulated waveform 208 as shown in FIG. 5. In other words, the width of the pulses vary according to the amplitude of the audio signal 204.

The pulse width modulated waveform 208 is applied to edge detect circuit 112. The edge detect circuit 112 includes dual comparators 113 and 114. The leading edge of a pulse of the pulse modulated waveform 208 turns on comparator 113 and generates a constant width pulse therefrom. The trailing edge of a pulse of the pulse modulated waveform 208 turns on comparator 114 and generates a constant width pulse therefrom. The polarity of such stream of constant width pulses 210, as shown in FIG. 5, generated based on the leading and trailing edges of the pulse width modulated waveform 208 are not important. The width of the pulses generated is controlled by pulse width limiting circuit 110 of edge detect circuit 112. For example, a reduction in capacitor values in the limit circuit 112 result in a shorter width pulse being generated.

As described previously, preferably, the constant width pulses of the stream of pulses 210 have a duty cycle that is less than 10 percent of the total cycle of the sawtooth waveform 206, more preferably, 5 percent of the total cycle. In other words, for the 50 kHz signal having a 20 μsec duty cycle, the constant width pulses are preferably less than about 2 μsec, and more preferably less than about 1 μsec.

The stream of constant width pulses 210 are applied to pulse driver circuit 116. The IR LEDs 118 are then driven by pulses from the pulse driver circuit 116 such that corresponding pulses of IR light are emitted therefrom.

Figure 4A:
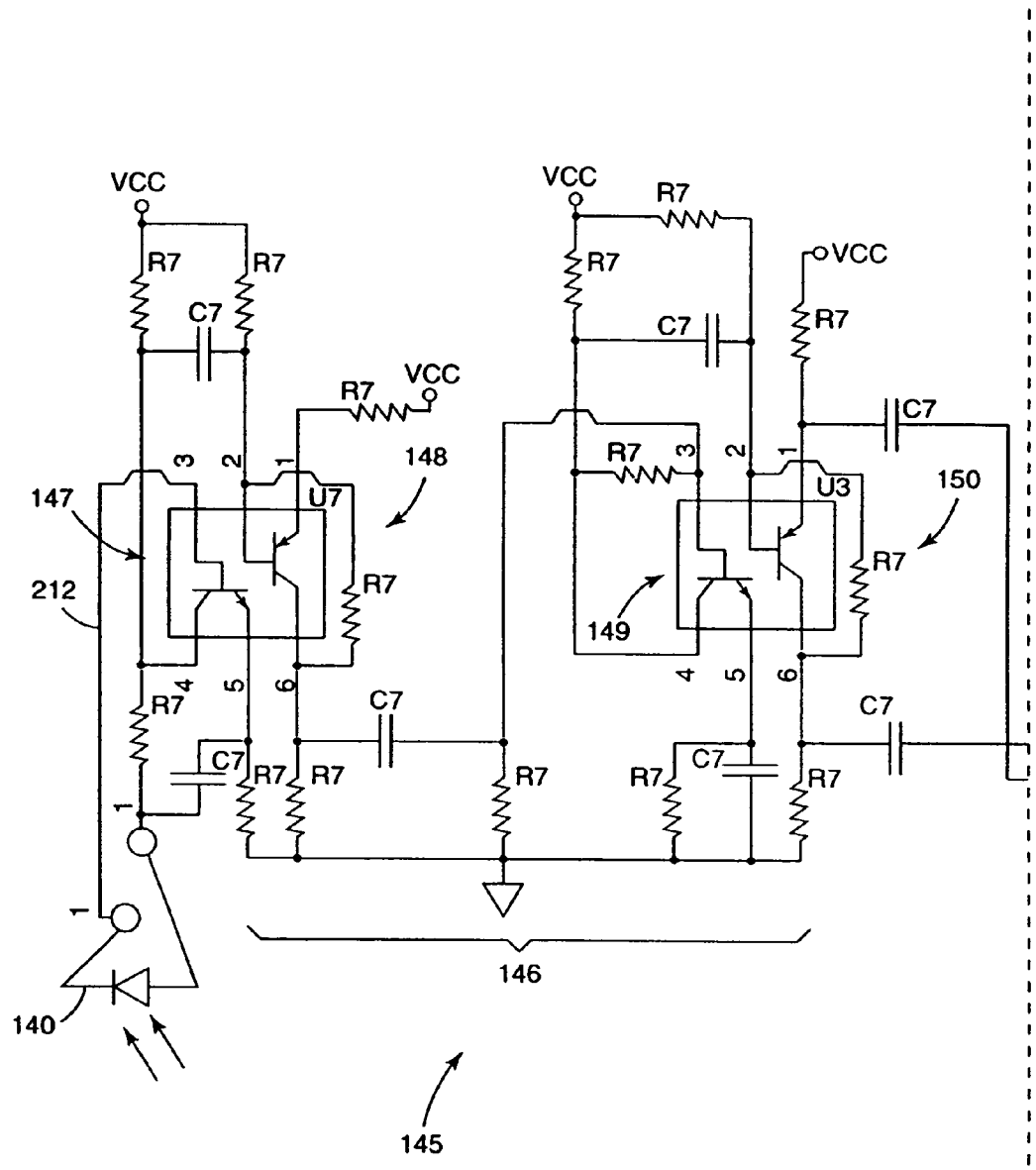
FIG. 4 is a schematic diagram of one illustrative embodiment of an IR receiver apparatus of a portable communication system shown generally in FIG. 2.
Figure 4B:
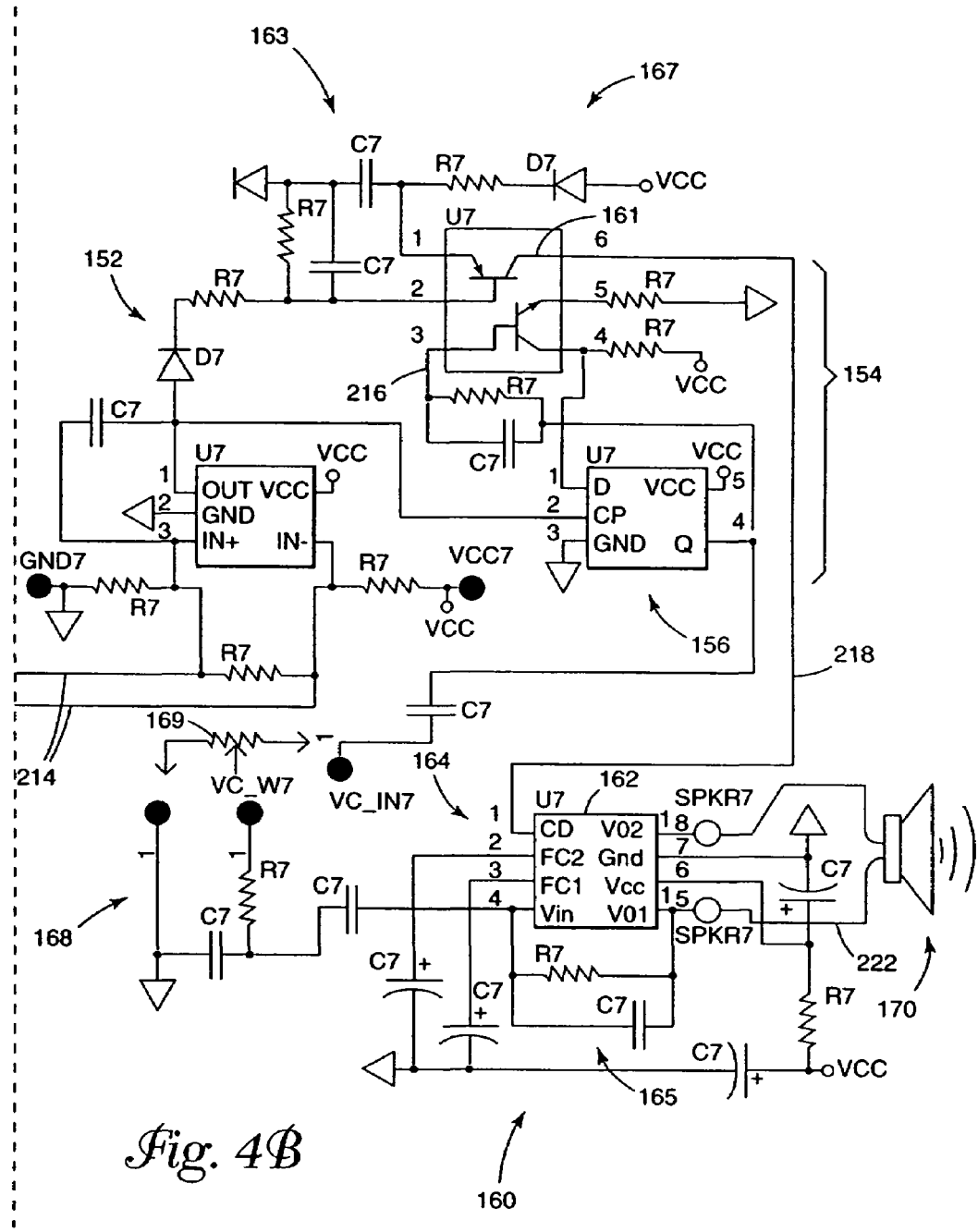

FIG. 4 shows a schematic diagram of one illustrative embodiment for implementing the IR receiver apparatus shown generally in FIG. 2. However, it will be recognized that various other alternative implementations may be used that fall within the scope of the present invention. For example, retriggerable and resettable one shot circuits along with logic gating may be used to implement functionality such as that provided by the flip flop. The IR receiver circuit 145 shown in FIG. 4 includes an IR sensitive photodiode 140, an amplification circuit 146, a comparator circuit 152, a pulse width converter circuit 154, a pulse width demodulation circuit 160, a volume control circuit 168, missing pulse detection circuit 167, and a speaker 170. The operation of such circuits shall be described with reference to the waveform diagram 216 of FIG. 6.

Figure 6:
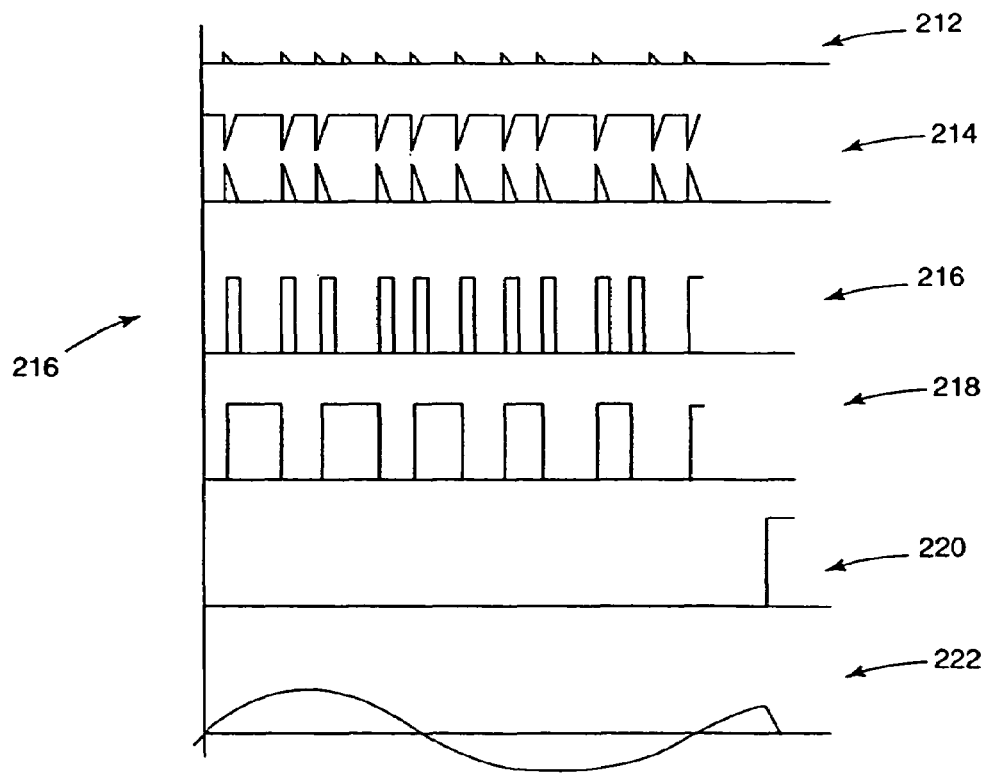
FIG. 6 is a waveform diagram used to illustrate the functions provided by the IR receiver apparatus of FIG. 4.

IR pulses are detected by IR sensitive photodiode 140 which generates an electrical signal 212 as shown in FIG. 6. The electrical output from the photodiode 140 includes electrical pulses corresponding to the IR pulses detected thereby. The electrical signal 212 is applied to amplification circuit 146.

Amplification circuit 146 receives and amplifies the signal for application to comparator circuit 152. The amplification circuit 146 includes three gain stages 147–149 and a buffer stage 150. Symmetrically opposed pulses are provided to comparator circuit 152 from the buffer stage 150. In other words, the stages 147–150 provide positive and negative amplified pulses 214, i.e., symmetrically opposite polarity pulses, as shown in FIG. 5 to the comparator circuit 152. As such, generally, at least in one embodiment, upon application of a detected pulse, the positive input of the comparator circuit 152 is taken higher and the negative input thereof is taken lower to provide a pulse output from the comparator circuit 152. The gain of the stages may be fixed as desired. Further, the gain of one or more stages may be adjusted on an ongoing basis to provide additional gain when distances increase between the transmitter and receiver. One will recognize that other amplification and comparison circuits may be used for detection purposes, e.g., comparison of the amplitude of a single pulse to a reference.

As such, the comparator circuit 152 determines if IR pulses have been received and generates a stream of pulses 216 as shown in FIG. 6 representative of the detected IR pulses. This stream of pulses 216 is then applied to the pulse width converter circuit 154 which basically divides the pulses by two. In other words, the flip flop 156 is toggled by the received pulses to convert the pulse stream 216 to a pulse width modulated stream of pulses 218 as shown in FIG. 6. This stream of pulse width modulated pulses 218 is then applied to pulse width demodulation circuit 160 which generates the audio signal 222 therefrom. For example, the demodulation circuit 160 includes amplifier/filter circuit 164 to filter the received pulse width modulated stream of pulses 218 to obtain the audio signal 222. The filtering is performed by filter components 165. The filtered audio signal is then provided to amplifier 162 for amplification, and thereafter, application to speaker 170 for sound production.

The volume of the speaker 170 is controlled by volume control circuit 168. The volume control circuit 168 includes a variable resistor that can be controlled by a user in any known manner, e.g., turning of a wheel, activating a push button, or any other method of user interface with a variable resistor.

The missing pulse detection circuit 167 of the receiver circuitry 145 detects when comparator 152 does not receive a pulse. The circuit 167 provides a chip disable signal to amplifier 162 when a pulse is not detected. This keeps the power amplifier 162 from being turned on and any sound from the speaker is muted when a missing pulse is detected. The output from the comparator circuit 152, i.e., pulses being detected, causes transistor 161 to remain turned off. Absence of pulses allow the switch to turn on activating the mute function. In other words, the output from the comparator circuit, i.e., when pulses are detected, is rectified and filter by circuit 163 to provide a voltage to cause the transistor 161, i.e., mute switch, to remain off. Absence of pulses allow the voltage (i.e., which is holding the switch 161 off) to drop causing the switch 161 to turn on. This pulls the chip disable of the amplifier 162 high, which turns off power to the speaker 170.

Figure 7A:
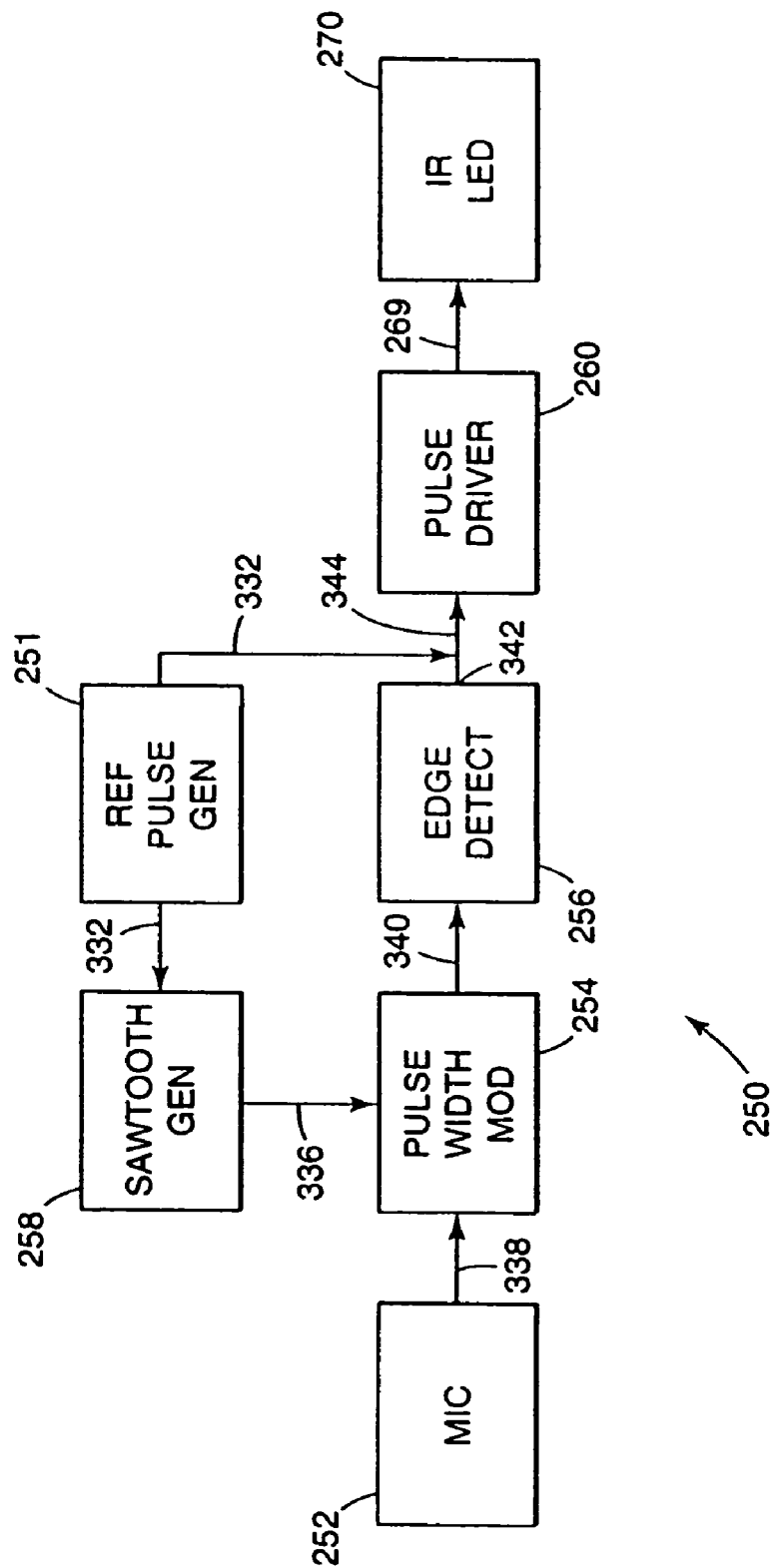
FIG. 7A is a block diagram of an alternate IR transmitter apparatus of a portable communication system shown generally in FIG. 1.
Figure 7B:
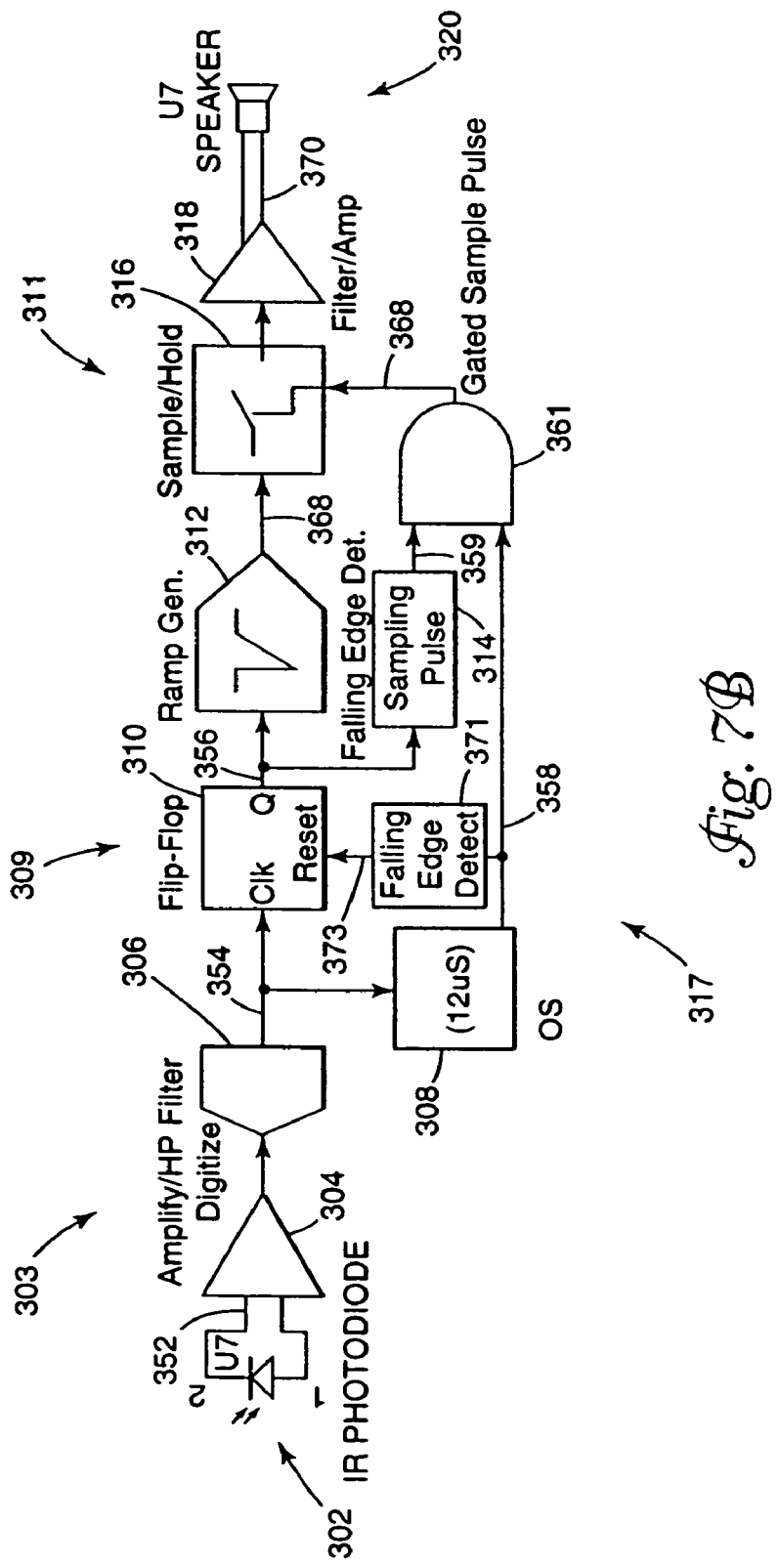
FIG. 7B is a block diagram of an alternate IR receiver apparatus of a portable communication system shown generally in FIG. 1.

FIG. 7A shows a block diagram of another illustrative embodiment of transmitter circuitry 250 of a portable communication system 10 like that described generally with reference to FIG. 1. The operation of the transmitter circuitry 250 shall be described with reference to the waveform diagram 330 of FIG. 8. FIG. 7B shows a block diagram of another illustrative embodiment of receiver circuitry 300 of a portable communication system 10 like that describes generally with reference to FIG. 1 and operable with the transmitter circuitry 250 of FIG. 7A.

Figure 8:
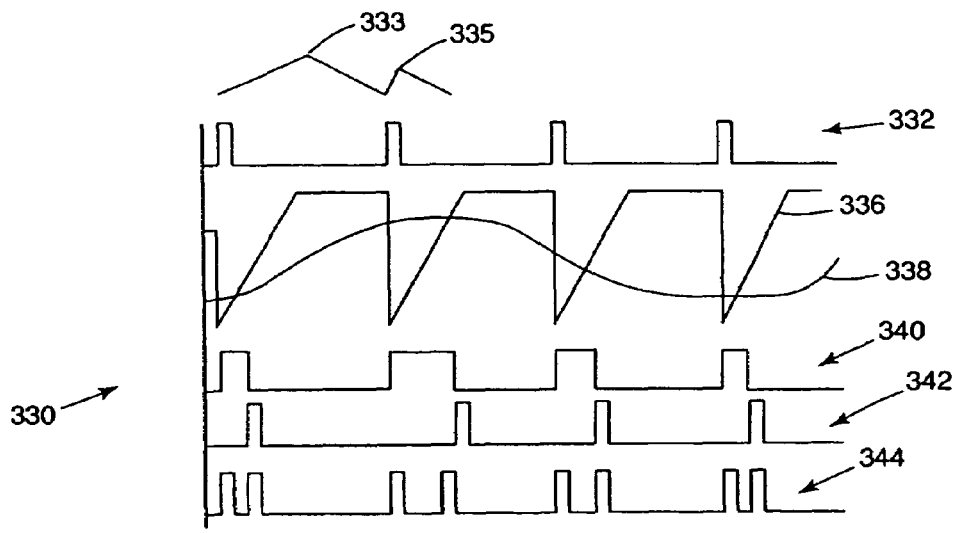
FIG. 8 is a waveform diagram used to illustrate the functions provided by the IR transmitter apparatus of FIG. 7A.

The transmitter circuitry 250 shown in FIG. 7A includes a microphone 252, a pulse width modulation circuit 254, a sawtooth generator circuit 258, a reference pulse generator circuit 251, an edge detect or edge to pulse conversion circuit 256, a pulse driver circuit 260, and a IR LED 270. The microphone 252 picks up sound input and applies an audio signal 338 as shown in FIG. 8, preferably amplified, to the pulse width modulation circuit 254, e.g., a comparator circuit. The sawtooth generator circuit 258 generates a sampling ramp signal 336 every cycle 333 as shown in FIG. 8, e.g., every 25 µseconds, based on a reference pulse signal 332 provided by pulse generator 251 at the start of every cycle. For example, the reference pulse may be a 1 µsecond constant width pulse provided every 25 µseconds.

Figure 9:
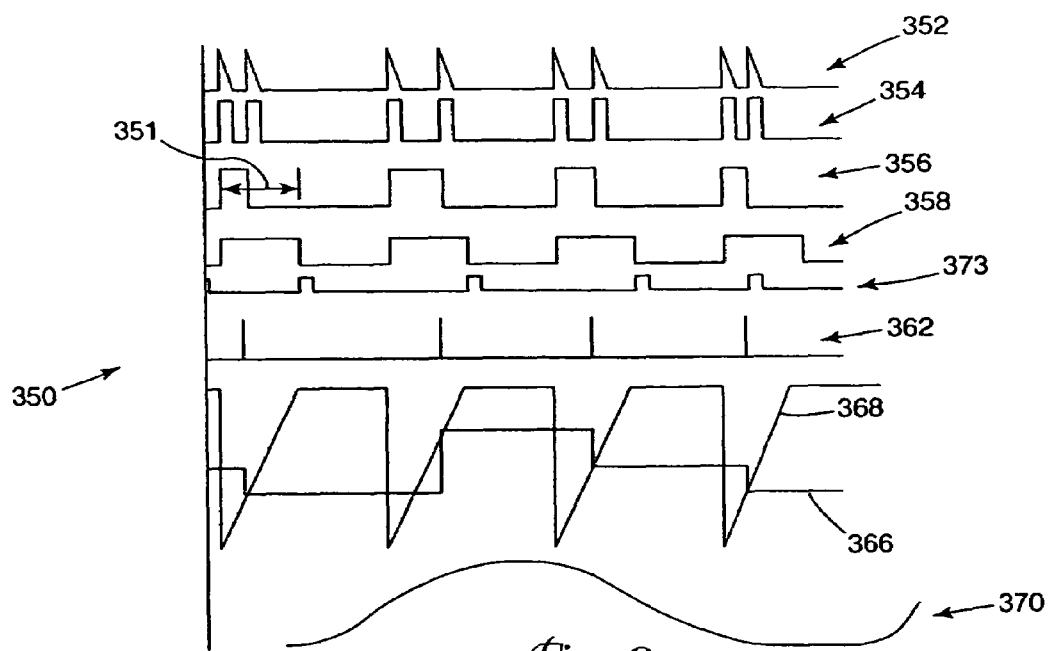
FIG. 9 is a waveform diagram used to illustrate the functions provided by the IR receiver apparatus of FIG. 7B.

The sampling ramp signal 336 is a sawtooth waveform much like the 50 kHz waveform described with reference to FIG. 3. However, the ramp time 335 as shown in FIG. 9 of the sampling ramp signal 336 is of shorter duration than the ramp of the previous waveform which extended during the entire cycle.

The sampling ramp waveform 336 is applied to the pulse width modulation circuit 254, e.g., a comparator circuit, along with the audio signal 338. The comparator circuit compares the audio signal 338 and the sampling ramp waveform 336, and generates an output that is a pulse width modulated waveform 340 as shown in FIG. 9. In other words, the width of the pulses vary according to the amplitude of the audio signal 338. However, the reason for using a shorter ramp duration is to make the pulse width of the pulses of pulse width modulated waveform 340 vary within a shorter time frame within the cycle time 333. For example, with a ramp duration of 10 µseconds and a 25 µseconds cycle time, the pulse width will vary between 2 µseconds and 10 µseconds. In other words, the 25 µseconds sample period has been compressed into a maximum of 10 µseconds (e.g., less than 50 percent duty cycle).

The pulse width modulated waveform 340 is applied to edge detect circuit 256 which detects the falling edge of the pulses of the pulse width modulated waveform 340 or, alternatively, both the rising and falling edges of the pulses of the pulse width modulated waveform 340. If only the falling edge is detected, the edge detect circuit 256 generates a constant width pulse stream representative of the falling edges 342 to be provided to the pulse driver 260 with the rising edge of the pulses being indicated by the stream of reference pulses 332 from reference pulse generator 251. However, preferably, both the rising and trailing edges are detected providing a stream of pulses representative thereof as shown by waveform 344 of FIG. 8. The width of the pulses generated is controlled as previously described herein. The stream of constant width pulses 344 is applied to pulse driver circuit 260. The IR LED 270 is then driven by pulses 269 from the pulse driver circuit 260 such that pulses of IR light are emitted therefrom.

The IR receiver circuit 300 shown in FIG. 7B includes an IR sensitive photodiode 302, a pulse detect circuit 303 including an amplification circuit 304 and digitization circuit 306, a pulse width converter circuit 309 including a flip flop 310, a one-shot circuit 308, a pulse width demodulation circuit 311, a duty cycle detection and polarity correction circuit 317, a filter/amplifier circuit 318, and speaker 320. IR pulses are detected by IR sensitive photodiode 302 which generates an electrical signal 352 including output pulses as shown in FIG. 9. The electrical output pulses from the photodiode 302 correspond to the IR pulses detected thereby. The electrical signal 352 is applied to amplification circuit 304 for amplification and provision to digitization circuit 306, e.g., a comparator circuit. The amplified pulses may be compared to a predetermined reference by the comparator circuit to determine if an IR pulse has been received. The comparator generates a stream of pulses 354, e.g., logic level pulses, representative of the detected IR pulses to be used in clocking the flip flop 310 of the pulse width converter circuit 309 which basically divides the pulses by two. In other words, the flip flop 310 is toggled by the received logic level pulses 354, e.g., rising edge pulses and falling edge pulses, to convert the pulse stream 354 to a pulse width modulated stream of pulses 356 as shown in FIG. 9. Also, the stream of pulses 354 are applied to the one shot circuit 308 for duty cycle detection and polarity correction purposes as described further below. The output of the flip flop 310 is rising edge detected and used to generate a reset pulse that marks the beginning of a linear ramp signal 368, as shown in FIG. 9, generated by ramp generator circuit 312 of pulse demodulation circuit 311. The output of the flip flop 310 is falling edge detected by falling edge detector 314 to generate a stream of sampling pulses 359. The rising edge pulse that causes the flip flop to change state at the rising edge of the pulse width modulated stream of pulses 356, also causes the one shot circuit 308 to start a time out period 351 running in which the trailing edge pulse that causes the state of the flip flop to change must be received before the one shot circuit 308 triggers a falling edge detector 373 to send a reset pulse to the flip flop 309, e.g., 12 μsecond when the ramp time is 10 μseconds. During the time out period 351, a high logic state is provided to the AND gate 361 by the one shot circuit 308 as shown by waveform 358 in FIG. 9. Upon occurrence of a falling edge pulse and detection of the falling edge of a pulse width modulated pulse of the stream of pulses 356 during the time out period 351, a short duration high sampling pulse 359 is provided by the falling edge detection circuit 314 of the duty cycle detection and polarity correction circuit 317 to the AND gate 361.

As high logic states are provided to the AND gate 361 from both the edge detection circuit 314 and the one shot circuit 308 when a falling edge is detected within time period 351, a gated sample pulse 362 is provided by the AND gate 361 to open a gate on a sample/hold circuit 316 that is sampling the linear ramp 368 generated by the ramp generator circuit 312. The gate closes and the ramp voltage last sampled is held until the next sample is taken. As such, the stepped waveform 366 as shown in FIG. 9 is provided from the sample/hold circuit 316. This stepped waveform 366 is then applied to the filter/amplifier circuit 318 to filter the received stepped voltage waveform 366 to obtain the audio signal 370 as shown in FIG. 9. The filtered audio signal 370 is then amplified and applied to speaker 320 for sound production.

The duty cycle detection and polarity correction circuit 317 is used to maintain polarity of the pulse width modulated stream of pulses 356. The falling edge pulse that is to used to change the state of the flip flop 310 from the state caused by leading edge pulse is expected to arrive at the flip flop 310 within the time period allowed for the modulated pulse, e.g., within 12 μseconds of the leading edge pulse that changes the state of the flip flop 310. The reset time-out period 351 as shown in FIG. 9 is set in which to detect the trailing edge pulse used to change the state of the flip flop 310. However, if the falling edge pulse is not detected, then the one-shot circuit 308 times out and triggers falling edge detector 371 to provide a reset pulse 373 as shown in FIG. 9 to the flip flop 310 to make the state of the flip flop 310 correct for the next received leading edge pulse. In other words, the one shot circuit 308 changes the logic state provided to the AND gate 361, e.g, it goes low, as shown in waveform 358 of FIG. 9, which triggers the falling edge detector 371. Although the falling edge due to the reset pulse is detected by the falling edge detection circuit 314 and a short high pulse is provided to the AND gate 361, with the one shot circuit input to the AND gate 361 being low, a gated sample pulse 362 is not provided to the sample and hold circuit 316. As such, the previously sampled state is maintained. In such a manner, the polarity of the pulse width modulated pulse stream 356 can be maintained. Being able to retain polarity is important because it reduces the noise caused by frequent polarity reversals due to marginal reception conditions.

This alternate embodiment described with reference to FIGS. 7–9, can be described in other general terms. For example, the transmitter is a fixed frequency (e.g., period of 25 μseconds) voltage to pulse width convertor with a less than 50% duty cycle. The receiver is a pulse width to voltage convertor that takes advantage of the maximum pulse width, e.g., 10 μseconds, for the modulated pulse together with fixed frequency to allow polarity determination. In other words, the operation can be referred to as mixed mode encoding. Analog information is provided by the pulse width modulated pulse stream, with each pulse occurring in less than half (e.g., 12 μseconds) of the cycle time (e.g., 25 μseconds). Further, one bit of digital polarity is encoded in the duty cycle (e.g., less than 50% or more than 50%) that is transmitted using the constant width pulse technique in which pulses representative of the rising and falling edges of a pulse width modulated stream of pulses are generated. The receiver detects the duty cycle and corrects the polarity of the received pulses.

Figure 10:
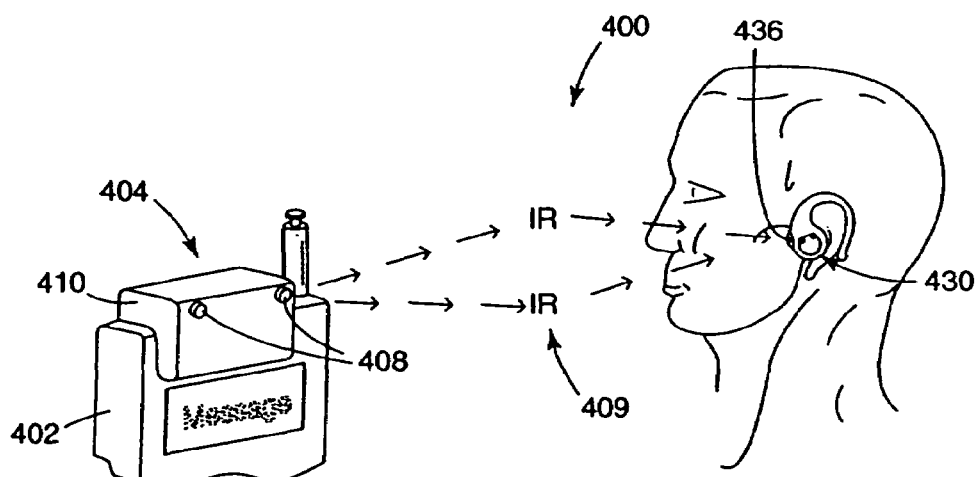
FIG. 10 is a perspective view of an IR transmitter apparatus and an IR receiver apparatus of a system as shown in FIG. 1 used with a phone apparatus.

FIG. 10 is a perspective view of an IR transmitter apparatus 404 and an IR receiver apparatus 430 of a portable IR communication system 400 which may implement one or more of the concepts described herein, e.g., modulation and demodulation circuitry. The IR transmitter apparatus 404 includes at least one infrared light emitting device 408 mounted on a transmitter housing 410 for transmission of IR signals 409 to IR receiver apparatus 430. The transmitter housing is configured to be removably coupled to the phone apparatus 402, e.g., a cellular phone, such that a microphone 407 (shown in FIG. 11) is positioned adjacent the sound output device 420 (also shown in FIG. 11) of the phone apparatus 402.

FIG. 11 is a more detailed perspective view of the IR transmitter apparatus 404 of FIG. 10 and the phone apparatus 402 to which it may be coupled. The transmitter housing 410 encloses a microphone 407 and any transmitter circuitry necessary to drive the IR light emitting devices 408, e.g., IR LEDs. Two infrared light emitting devices 408 are mounted on the transmitter housing 410, however any suitable number of LEDs may be used. The transmitter housing 410 is configured with an opening 417 sized to fit over an end 422 of phone apparatus 402. The transmitter housing 404 functions like a cap mounted, e.g., snap fitted, on the end 422 and provides microphone 407 adjacent sound output 420. The transmitter housing 410 includes cap portion 421 having opening 417 defined therein for fitting over the end of multiple types of phones. As such, the transmitter apparatus 404 is a universal apparatus that can be switched from one phone to another. The cap portion 421 also includes a battery pod or compartment 416 defined therein to hold a power source. Extending from the preferably rectangular cap portion 421 is a microphone housing portion 423 that houses the microphone 407. The microphone housing portion 423 is preferably orthogonal to the cap portion 421. Preferably, the transmitter housing 410 holds the microphone 407 adjacent the sound output 420 in a stable position, e.g., without significant movement being allowed that may cause quality problems. Some movement may be tolerated.

Various dampening structures 412, e.g., pads, are provided for housing isolation between the phone apparatus 402 and transmitter housing 410. Further, acoustic dampening material 414 is provided relative to the microphone 407 to provide housing isolation and prevent external noise from reaching the microphone 407. For example, in FIG. 11, a ring of acoustic dampening material 414 is provided about the microphone 407.

Another illustrative embodiment of a transmitter housing 472 of a transmitter apparatus 470 is shown in FIG. 13. The transmitter housing 472 has IR LEDs 474 mounted thereon. In this embodiment, the transmitter housing 472 includes a band element 476, e.g. two portions that fasten together, that can wrap around a perimeter of a phone apparatus such that microphone 477 of the transmitter apparatus 470 is adjacent a sound output (not shown) of a phone apparatus. The microphone 477 is surrounded by acoustic dampening material 479 in much the same manner as described with reference to FIG. 11. The band element 476 has associated therewith fastening elements 478 on one or both of the portions of band element 476. For example, the fastening elements 478 may include hook and loop fasteners, releasable adhesives, etc. Further, the band element 476 may be formed of a single elastic material to hold the transmitter apparatus 470 about the phone apparatus.

Several illustrative diagrams of receiver apparatus usable in accordance with the present invention will be described with reference to FIGS. 12A–12C and FIG. 14. Although such receiver apparatus can be used in conjunction with the transmitter apparatus described herein, various other types of IR receivers may be used with such transmitter apparatus, including IR headsets as opposed to ear supported devices.

Figure 12A:
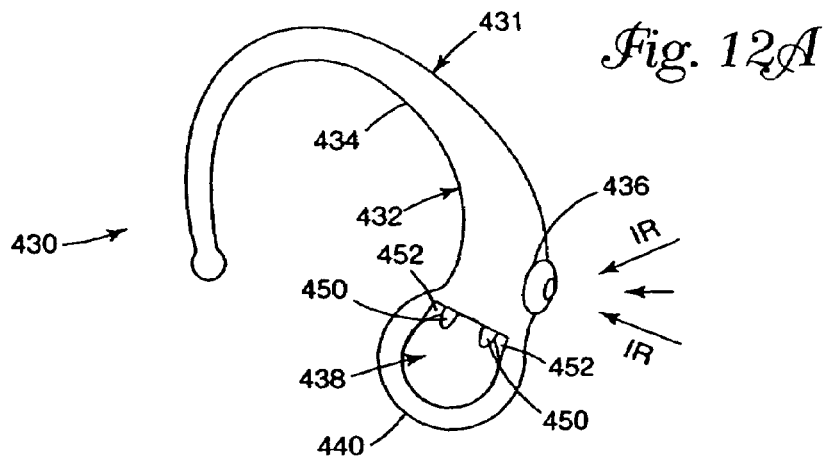
FIG. 12A is a side view of the IR receiver apparatus of FIG. 10.
Figure 12B:
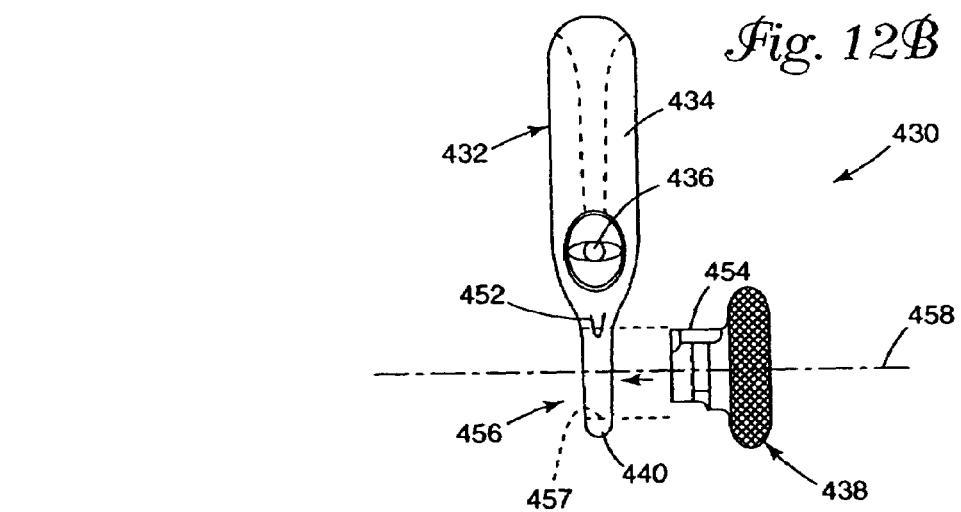
FIG. 12B is an exploded end view of the IR receiver apparatus of FIG. 12A.
Figure 12C:
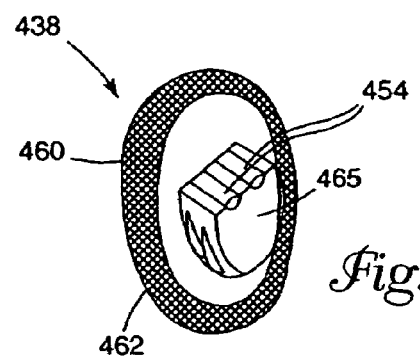
FIG. 12C is a perspective rear view of a speaker portion of the IR receiver apparatus of FIG. 12B.

FIG. 12A is a side view of the IR receiver apparatus 430 shown in FIG. 10. FIG. 12B is an exploded end view of the IR receiver apparatus 430 of FIG. 10 and FIG. 12C is a perspective rear view of a speaker portion of the IR receiver apparatus 430 of FIG. 12B. The IR receiver apparatus 430 includes a receiver housing 431 that is configured as a behind the ear receiver securable by the pinna of the ear. The receiver housing 431 includes a first body portion 432 that includes a behind the ear element 434 to secure the receiver housing 431 by the pinna of the ear and a speaker holding element 440 extending from the behind the ear element 434. Preferably, the behind the ear element 434 is of a curved nature to comfortably wrap around the pinna of the ear with at least one IR sensitive photodiode 436 positioned at a surface of the behind the ear element 434. Preferably, the IR sensitive photodiode 436 is located such that it is facing the same direction as the user's face when receiver apparatus 430 is secured by the pinna of the ear.

The speaker holding element 440 has an opening 456 defined therethrough along axis 458. Preferably, the opening 456 is of an oblong or circular shape cross sectional shape, but any shape or size may be used. The opening 456 has an inner surface 457 that includes speaker contacts 452 mounted therein.

The receiver housing 431 further includes a second body portion 438 encompassing at least the speaker of the receiver apparatus 430. The second body portion 438 is sized to be retained within the opening 456. Further, the second body portion 438 includes speaker contacts 454 for mating with the speaker contacts 452 mounted in the opening 456 of the speaker holding element 440 of the first body portion 432.

The second body portion 438 preferably includes a speaker element portion 460 and a connection portion 465. Further, preferably, the speaker portion 460 that lies outside of the opening 456 when the second portion 438 is assembled with the first portion 431 has a compressible material cover 462, e.g., foam, to provide comfort to the user and adequate coupling of sound to the ear. The connection portion 465 is sized to fit in the opening 456 such that the contacts 454 at a surface of the connection portion 465 mate with the contacts 452 in the contact region 450 of the receiver housing 431. Preferably, the transmitter components other than the speaker are mounted in the first body portion 432 of the receiver housing 431. However, depending on the size of such components they could be mounted in either or both such body portions.

With the IR receiver housing 431 having a separate second body portion 438 that is removable from the opening 456, the second body portion 438 can be inserted in the opening 456 from either direction along axis 458 with mating of the contacts 454 and 452 occurring independent of the direction of insertion. As such, the receiver housing 431 can be secured to either ear of the user with the speaker element portion 460 of the second body portion 438 being next to the user's ear and the IR LED facing forward.

Figure 14:
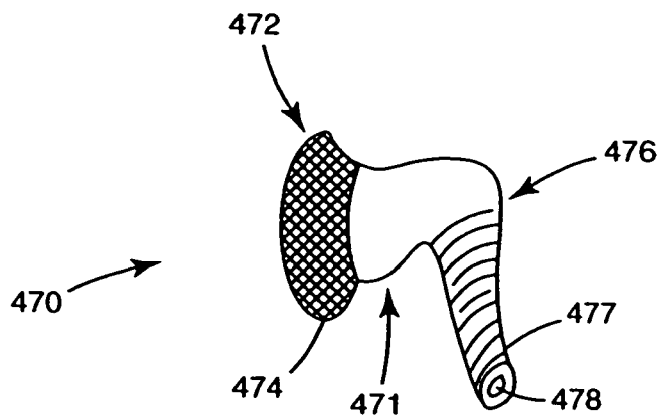
FIG. 14 is a side view of an alternate embodiment of an IR receiver apparatus, e.g., earbud.

FIG. 14 is a side view of an alternate embodiment of an IR receiver apparatus 470, e.g., earbud receiver. The receiver apparatus 470 includes a receiver housing 471 that is securable within the concha of the ear. The receiver housing 471 includes a speaker portion 472 that encloses at least the speaker and preferably, also a power source of the receiver (e.g., battery, not shown). The speaker portion 472 has a compactable/expandable material 474 (e.g., foam, sponge, etc.) about at least a portion thereof to support the receiver housing 471 in the concha of the ear. The material 474 is placed in a compacted state upon insertion in the concha of the ear. Thereafter, when released from the compacted state, the material expands to an expanded state to hold the receiver housing 471 in the concha of the ear.

The receiver housing 471 further includes an elongated portion 476 that extends from the speaker portion 472. Preferably, the elongated portion 476 generally extends in a direction orthogonal from the speaker portion 472, or at least in a non-aligned direction. The weight of the apparatus 470 is concentrated in the speaker portion 472 for stability within the concha of the ear. Further, at least a portion of the transmitter components are enclosed by the elongated portion 476 with at least one IR sensitive device 478, e.g. IR photodiode, mounted thereon. Preferably, an IR photodiode 478 is mounted towards the distal end 477 of the elongated portion 476. In such a position, the elongated portion 476 can be adjusted to "point" the photodiode in a particular direction that may assist in reception of IR signals. Further, the elongated portion 476 may be formed as a flexible portion to allow for positioning of the photodiode for reception and also for stability positioning of the apparatus in the ear.

Figure 15:
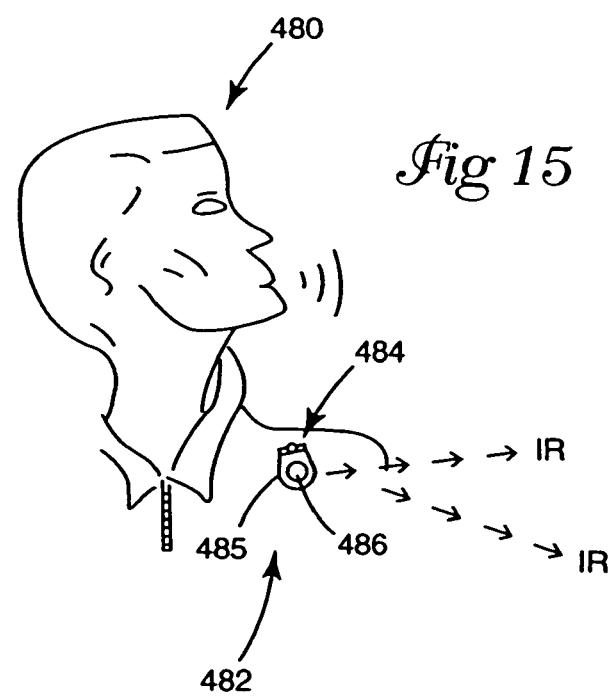
FIG. 15 is a an illustrative perspective view of a lapel IR transmitter apparatus useable with the communication system of FIG. 1.
Figure 16A:
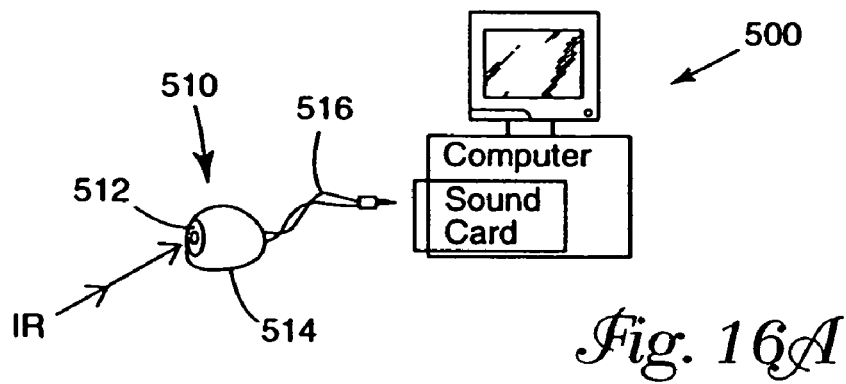
FIGS. 16A–16B are illustrations of corded IR transmitters and receivers usable with the communication system of FIG. 1.
Figure 16B:
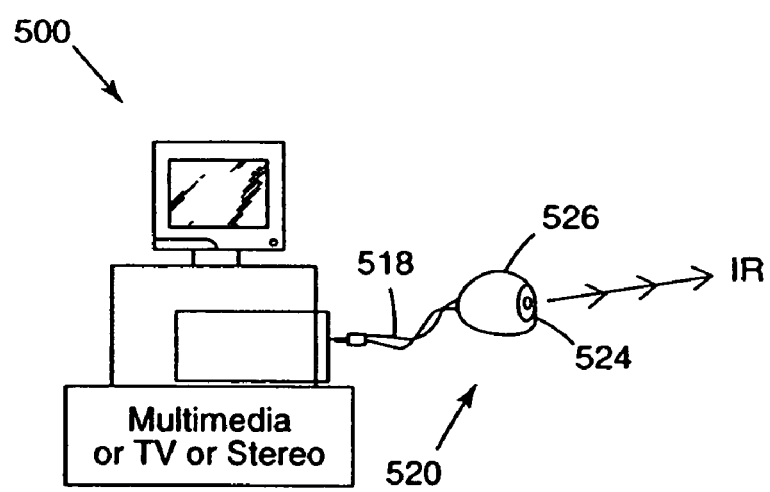

FIG. 15 is a perspective view of a lapel IR transmitter apparatus 482 useable with the communication system of FIG. 1 and FIGS. 16A–16B are illustrations of corded IR transmitters 520 and receivers 510 usable with the communication system of FIG. 1. Such embodiments are provided to show the additional components that may be used in a portable system as described with reference to FIG. 1.

For example, a user 480 may wear the lapel transmitter 482 that includes a microphone 484 for picking up sound input. The transmitter apparatus 482 may transmit using the IR light emitting device 486 driven by circuitry within housing 485. Such IR signals may be received by an IR wireless receiver apparatus such as described herein. Further, the modulation/demodulation techniques described herein may be used for communication using the lapel transmitter 482 or any other transmitter apparatus.

Further, as shown in FIG. 16A, a corded IR receiver 510 having a corded connection element 516, e.g., a jack, may be used for receiving IR signals generated according to the present invention. For example, the receiver may be connected to a computer 500 having a sound card for output of sound based on the received IR signals detected by IR sensitive diode 512 and demodulated by circuitry within housing 514.

Yet further, as shown in FIG. 16B, a corded IR transmitter 520 having a corded connection element 518, e.g., a jack, may be used for transmitting IR signals generated according to the present invention. For example, the transmitter apparatus 520 may be connected to a computer 500 having a sound output jack for providing audio signal to IR transmitter 520 for modulation by circuitry within housing 526 for transmission by IR LED 524.

One skilled in the art will recognize that various accessories items may be provided in conjunction with the present invention to provide suitable communication between the transmitter apparatus and receiver apparatus. For example, a dashboard cradle or holder may be used to place the phone apparatus having the transmitter coupled thereto in a position suitable for IR communication to be accomplished. Further phone positioning devices may include a visor clip, a window slit cradle similar to a cup holder, etc.

Preferably, according to the present invention, the ear secured housing only includes a receiver and does not include any transmitter components. With respect to use of the present invention with a phone apparatus, the microphone of the phone apparatus is believed to be able to pick up voice from a user when the phone apparatus is within a certain distance from the user. Thus, the need for additional components to relay voice to the microphone of the phone apparatus are unnecessary. However, the present invention contemplates the use of the system and methods described herein with other voice reception equipment.

A method of using a portable communication system 10 described with reference to FIG. 1 with a phone apparatus (such as shown in FIG. 11) having a sound output device is one significant application of the system of the present invention. The method includes providing the removable transmitter apparatus 12 that includes the transmitter housing 28 enclosing at least the microphone and modulation circuitry. The removable transmitter apparatus 12 is secured to the phone apparatus such that the microphone is positioned adjacent the sound output device of the phone apparatus as previously described herein or in any other manner, e.g., cap mounting or with use of a wrap around band. Being removable, the transmitter apparatus may be detached from the phone apparatus and secured to a different phone apparatus. In such a method, the transmission technique need not be IR, but could be RF or any other suitable wireless transmission techniques.

All patents and references cited herein are incorporated in their entirety as if each were incorporated separately. It is to be understood that the above description is intended to be illustrative, and not restrictive to the present invention. Many other embodiments will be apparent to those skilled in the art upon reviewing the above description. The scope of the invention should, therefore, be determiined with reference to the appended claims along with the full scope of equivalents to which such claims are entitled.

What is claimed is:

1. A portable communication system comprising:
    an infrared transmitter apparatus, wherein the infrared transmitter apparatus comprises:
        at least one infrared light emitting device,
        modulation circuitry operable to convert a signal to one or more constant width electrical pulses to drive the infrared light emitting diode to transmit one or more corresponding constant width infrared pulses, and
        a transmitter housing enclosing the modulation circuitry and upon which the at least one infrared light emitting device is mounted; and
    an infrared receiver apparatus, wherein the infrared receiver apparatus comprises:
        an infrared light detection device to detect the one or more corresponding infrared pulses and generate one or more electric signals representative of the detected infrared pulses,
        a speaker,
        demodulation circuitry operable to convert the one or more electric signals representative of the detected infrared pulses to an audio signal to power the speaker to produce a sound output, and
        a receiver housing enclosing the speaker and the demodulation circuitry and upon which the infrared light detection device is mounted, wherein the receiver housing is formed to be self-supported entirely by the ear of a user.

2. The system of claim 1, wherein the transmitter housing includes means for removably attaching the housing to the phone apparatus.

3. The system of claim 1, wherein the receiver housing comprises an in the ear receiver housing securable within the concha of the ear.

4. The system of claim 1, wherein the receiver housing comprises a behind the ear receiver housing securable by the pinna of the ear.

5. The system of claim 1, wherein the receiver housing comprises:
    a first portion including a behind the ear element and a speaker holding element having an opening defined therethrough, wherein the speaker holding element includes speaker contacts; and
    a second portion encompassing the speaker, wherein second portion is sized to be retained within the opening and includes speaker contacts for mating with the speaker contacts of the speaker holding element.

6. The system of claim 1, wherein modulation circuitry comprises:
    pulse width modulation circuitry to convert the audio signal using a carrier signal to one or more width modulated pulses, wherein the width of the one or more pulses is varied as a function of the audio signal;
    an edge detect circuit to detect the edges of the one or more width modulated pulses and generating constant width pulses based on the detected edges; and
    a pulse driver circuit to drive the infrared light emitting device.

7. The system of claim 1, wherein demodulation circuitry comprises:
    pulse detection circuitry to convert the one or more electrical signals representative of the detected infrared pulses to one or more constant width pulses based thereon;

pulse width convertor circuitry to convert the one or more constant width pulses to one or more width modulated pulses; and pulse width modulation circuitry to convert the one or more width modulated pulses to an audio signal for application to the speaker.

8. The system of claim 7, wherein the pulse detection circuitry comprises:

an amplifier configuration to provide symmetrically opposed polarity electrical pulses corresponding to each of the one or more electrical signals representative of the detected infrared pulses; and a comparator to generate a constant width pulse each time symmetrically opposed polarity electrical pulses are applied thereto.

9. The system of claim 7, wherein the pulse width convertor circuitry comprises a divide by two circuit.

10. The system of claim 7, wherein the receiver further comprises missing pulse detection circuitry comprising:

detection circuitry to detect the absence of constant width pulses; and disable circuitry to disable one or more components of the receiver upon detection of such absence of constant width pulses.

11. The system of claim 1, wherein the transmitter apparatus further comprises a sound activated power circuit to power one or more components of the transmitter upon detection of sound input.

12. The system of claim 1, wherein the one or more constant width electrical pulses to drive the infrared light emitting device are less than about 2 microsecond in duration.

13. The system of claim 12, wherein the one or more constant width electrical pulses to drive the infrared light emitting device are less than about 1 microsecond in duration.

14. A portable infrared receiver apparatus comprising:

an infrared light detection device to detect one or more infrared pulses and generate one or more electric signals representative of the detected infrared pulses;

a speaker;

demodulation circuitry operable to convert the one or more electric signals representative of the detected infrared pulses to an audio signal to power the speaker to produce a sound output, wherein the demodulation circuitry comprises:

pulse detection circuitry to convert the one or more electrical signals representative of the detected infrared pulses to one or more constant width pulses based thereon, pulse width convertor circuitry to convert the one or more constant width pulses to one or more width modulated pulses, and pulse width modulation circuitry to convert the one or more width modulated pulses to an audio signal for application to the speaker, and a receiver housing enclosing the speaker and the demodulation circuitry and upon which the infrared light detection device is mounted, wherein the receiver housing is formed to be self-supported entirely by the ear of a user.

15. The apparatus of claim 14, wherein the receiver housing comprises an in the ear receiver housing securable within the concha of the ear, and further wherein the receiver housing includes:

a speaker portion enclosing the speaker and a power source, the speaker portion having a compactable/expandable material about at least a portion thereof to support the receiver housing in the concha of the ear, wherein the material is placed in a compacted state upon insertion in the concha of the ear and further wherein the material expands to an expanded state to hold the receiver housing in the concha of the ear upon release from the compacted state, and an elongated portion extending from the speaker portion enclosing at least a portion of the demodulation circuitry, wherein the infrared light detection device is positioned on the elongated portion.

16. The apparatus of claim 14, wherein the receiver housing comprises a behind the ear receiver housing securable by the pinna of the ear, and further wherein the receiver housing includes:

a first portion comprising:

a behind the ear element to secure the receiver housing by the pinna of the ear, and a speaker holding element extending from the behind the ear element, wherein the speaker holding element has an opening defined therethrough, and further wherein the speaker holding element includes speaker contacts; and a second portion encompassing the speaker, wherein second portion is sized to be retained within the opening and includes speaker contacts for mating with the speaker contacts of the speaker holding element.

17. The apparatus of claim 16, wherein the speaker contacts of the speaker holding element are positioned on a surface defining the opening.

18. The apparatus of claim 14, wherein the demodulation circuitry comprises:

pulse detection circuitry to convert the one or more electrical signals representative of the detected infrared pulses to one or more constant width pulses based thereon;

pulse width convertor circuitry to convert the one or more constant width pulses to one or more width modulated pulses; and pulse width modulation circuitry to convert the one or more width modulated pulses to an audio signal for application to the speaker.

19. The apparatus of claim 18, wherein the pulse detection circuitry comprises:

an amplifier configuration to provide symmetrically opposed polarity electrical pulses corresponding to each of the one or more electrical signals representative of the detected infrared pulses; and a comparator to generate a constant width pulse each time the symmetrically opposed polarity electrical pulses are applied thereto.

20. The apparatus of claim 18, wherein the pulse width convertor circuitry comprises a divide by two circuit.

21. The apparatus of claim 18, wherein the receiver further comprises missing pulse detection circuitry comprising:

detection circuitry to detect the absence of constant width pulses; and disable circuitry to disable one or more components of the receiver upon detection of such absence of constant width pulses.

* * * * *